(12) United States Patent　　(10) Patent No.: US 9,422,119 B1
Fortenbery et al.　　(45) Date of Patent: *Aug. 23, 2016

(54) INDEPENDENT DISCHARGE SORTING CONVEYOR

(71) Applicant: Mantissa Corporation, Charlotte, NC (US)

(72) Inventors: J. David Fortenbery, Charlotte, NC (US); David Patrick Erceg, Concord, NC (US); Gonzalo Sotelo, Charlotte, NC (US); Charles P. Howell, III, Charlotte, NC (US); Gregory P. Kissel, Charlotte, NC (US); Daniel H. Weckerle, Charlotte, NC (US); LeRoy A. Winkler, III, Charlotte, NC (US)

(73) Assignee: Mantissa Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/330,611

(22) Filed: Jul. 14, 2014

Related U.S. Application Data

(63) Continuation of application No. 13/529,584, filed on Jun. 21, 2012, now Pat. No. 8,807,320.

(51) Int. Cl.
　　*B65G 47/96*　　(2006.01)
　　*B65G 47/38*　　(2006.01)
　　*B65G 17/12*　　(2006.01)

(52) U.S. Cl.
　　CPC ............... *B65G 47/38* (2013.01); *B65G 17/12* (2013.01); *B65G 47/962* (2013.01)

(58) Field of Classification Search
　　CPC ..... B65G 47/38; B65G 17/12; B65G 47/962
　　See application file for complete search history.

(56) References Cited

U.S. PATENT DOCUMENTS

| | | |
|---|---|---|
| 3,034,665 A | 5/1962 | Speaker |
| 3,119,488 A | 1/1964 | Rabinow et al. |
| 3,167,192 A | 1/1965 | Harrison et al. |
| 3,211,279 A | 10/1965 | Smith |
| 3,233,720 A | 2/1966 | Atanasoff et al. |
| 3,265,190 A | 8/1966 | Boehm |
| 3,270,860 A | 9/1966 | Siebach |
| 3,510,014 A | 5/1970 | Speaker et al. |
| 3,577,928 A | 5/1971 | Victerri et al. ........ 104/148 LM |

(Continued)

OTHER PUBLICATIONS

"Progress Reports, VDI, Row 13", German text, vol. 1998 vol. 47, pp. 16-51.

(Continued)

*Primary Examiner* — Thomas Randazzo
(74) *Attorney, Agent, or Firm* — MacCord Mason PLLC

(57) ABSTRACT

A sorting conveyor for transporting objects and unloading objects at one or more unloading stations adjacent the conveyor. The sorting conveyor includes a conveyor track and a train of conveyor carts connected end-to-end. At least one of the conveyor carts may include a frame base for engaging the conveyer track; a carrying tray for holding the objects; and a support for supporting the carrying tray above the frame base. A tilting mechanism including at least one gear having at least one cam is adapted for tilting the carrying tray toward at least one side of the conveyor. The present inventions may further include a tilt sensor for determining the direction of tilt of the tray. In addition, a drive motor and a driven member attached to the frame base may be included for moving the conveyor carts around the track.

41 Claims, 25 Drawing Sheets

(56) References Cited

U.S. PATENT DOCUMENTS

| | | | | |
|---|---|---|---|---|
| 3,630,394 | A | 12/1971 | Kingzett | 214/62 A |
| 3,669,245 | A | 6/1972 | Wooten et al. | 198/155 |
| 3,749,025 | A | 7/1973 | Giraud | 104/25 |
| 3,788,447 | A | 1/1974 | Stephanoff | 193/41 |
| 3,834,316 | A | 9/1974 | Hennings | 104/148 LM |
| 3,848,728 | A | 11/1974 | Leibrick et al. | 198/155 |
| 3,881,609 | A | 5/1975 | Ellis et al. | 214/11 R |
| 3,910,406 | A | 10/1975 | Pulver et al. | 198/189 |
| 3,945,485 | A | 3/1976 | Speaker | 198/155 |
| 3,974,909 | A * | 8/1976 | Johnson | B65G 47/962 105/272 |
| 3,977,513 | A | 8/1976 | Rushforth | 198/38 |
| 4,004,681 | A | 1/1977 | Clewett et al. | 198/796 |
| 4,031,998 | A | 6/1977 | Suzuki et al. | 198/365 |
| 4,102,448 | A | 7/1978 | Wolbrink et al. | 198/365 |
| 4,174,773 | A | 11/1979 | Venzke | 198/365 |
| 4,197,933 | A | 4/1980 | Dunstan et al. | 198/334 |
| 4,413,721 | A | 11/1983 | Bollier | 198/365 |
| 4,512,710 | A | 4/1985 | Flatau | 414/735 |
| 4,635,785 | A * | 1/1987 | Prydtz | B65G 47/962 198/370.04 |
| 4,669,388 | A | 6/1987 | Dehne et al. | 104/162 |
| 4,726,464 | A | 2/1988 | Canziani | 198/365 |
| 4,744,454 | A | 5/1988 | Polling | 198/365 |
| 4,841,869 | A | 6/1989 | Takeuchi et al. | 104/292 |
| 4,846,335 | A * | 7/1989 | Hartlepp | B65G 47/962 198/370.04 |
| 4,848,242 | A | 7/1989 | Matsuo | 104/290 |
| 4,856,642 | A * | 8/1989 | Nicholson | B65G 47/962 198/370.04 |
| 4,876,966 | A | 10/1989 | Okawa et al. | 104/290 |
| 4,919,054 | A | 4/1990 | Matsuo | 104/94 |
| 4,982,828 | A * | 1/1991 | Nicolson | B65G 47/962 198/370.04 |
| 4,984,674 | A * | 1/1991 | Fortenberry | B65G 47/962 198/370.04 |
| 5,054,601 | A | 10/1991 | Sjogren et al. | 198/365 |
| 5,086,905 | A * | 2/1992 | Polling | B65G 47/96 198/370.03 |
| 5,176,485 | A | 1/1993 | Ruder et al. | 414/392 |
| 5,255,774 | A * | 10/1993 | Yokoya | B65G 47/962 198/370.03 |
| 5,271,492 | A | 12/1993 | Lewin et al. | 198/830 |
| 5,372,234 | A * | 12/1994 | Fortenberry | B65G 47/962 198/890.1 |
| 5,433,311 | A * | 7/1995 | Bonnet | B65G 17/345 198/370.04 |
| 5,664,660 | A * | 9/1997 | Prydtz | B65G 47/962 198/370.03 |
| 5,676,514 | A * | 10/1997 | Higman | B61B 13/04 198/349 |
| 5,836,436 | A * | 11/1998 | Fortenbery | B65G 11/023 198/370.03 |
| 5,894,918 | A * | 4/1999 | Bonnet | B65G 17/086 198/370.02 |
| 6,003,656 | A * | 12/1999 | Fortenbery | B65G 47/962 198/370.03 |
| 6,009,992 | A * | 1/2000 | Erceg | B65G 47/962 198/370.04 |
| 6,182,813 | B1 | 2/2001 | Bonnet | 198/370.09 |
| 6,239,744 | B1 * | 5/2001 | Singer | H01Q 1/246 342/359 |
| 6,246,023 | B1 * | 6/2001 | Kugle | B07C 5/36 104/290 |
| 6,298,975 | B1 * | 10/2001 | Fortenbery | B65G 47/38 104/284 |
| 6,367,610 | B1 * | 4/2002 | Fortenbery | B65G 47/962 198/370.03 |
| 6,382,392 | B1 * | 5/2002 | Fortenbery | B65G 47/962 198/370.03 |
| 6,502,687 | B1 * | 1/2003 | Ayen | B65G 47/962 198/370.04 |
| 6,736,254 | B1 * | 5/2004 | Fortenbery | B65G 47/962 198/370.03 |
| 6,959,803 | B1 | 11/2005 | Layne et al. | 198/600 |
| 7,284,654 | B2 * | 10/2007 | Affaticati | B65G 47/962 198/370.04 |
| 8,069,976 | B1 | 12/2011 | Fortenbery et al. | 198/860.1 |
| 8,851,267 | B2 * | 10/2014 | Sotelo | B65G 17/12 198/370.04 |
| 2013/0126304 | A1 * | 5/2013 | Stikkelorum | B65G 47/40 198/477.1 |
| 2013/0168300 | A1 * | 7/2013 | Malone | B07C 5/3412 209/583 |
| 2013/0341157 | A1 | 12/2013 | Fortenbery et al. | 198/370.04 |
| 2015/0083549 | A1 * | 3/2015 | Ram | 198/358 |

OTHER PUBLICATIONS

"Design and Composition of Drive Systems for Bulk Goods-Sorting Machines," Engineering Process, Statistic Reports VDI, Row 13: Conveyor Technique/Logistics, No. 47, 1998.

* cited by examiner

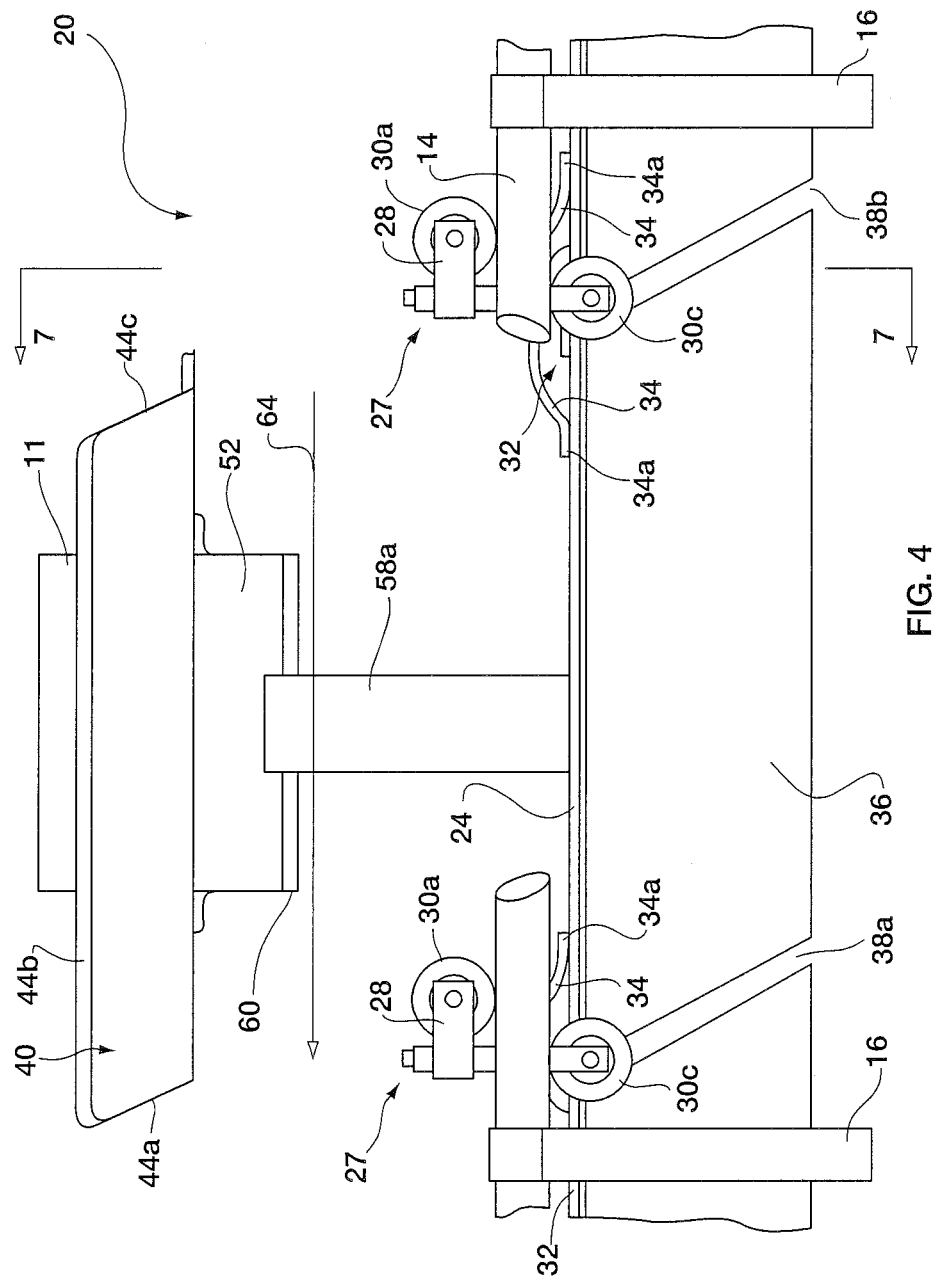

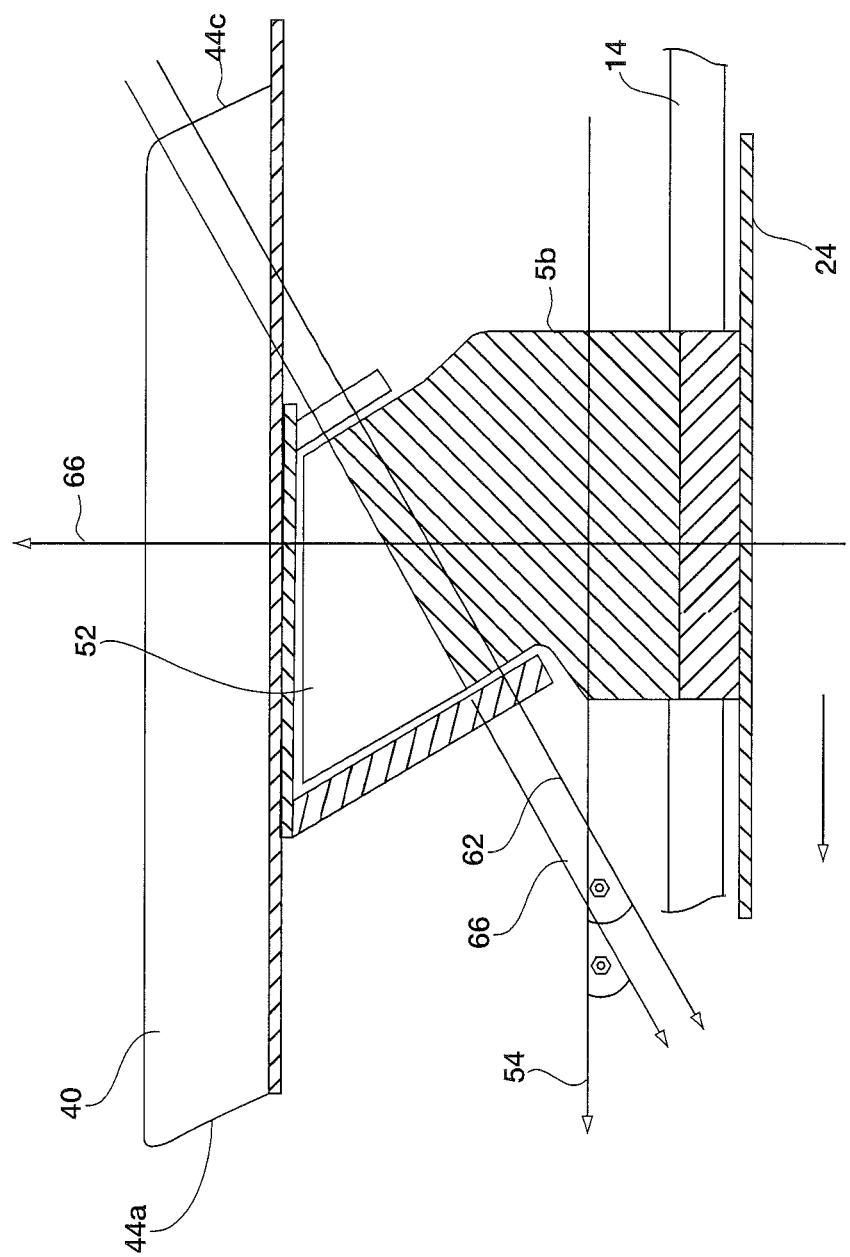

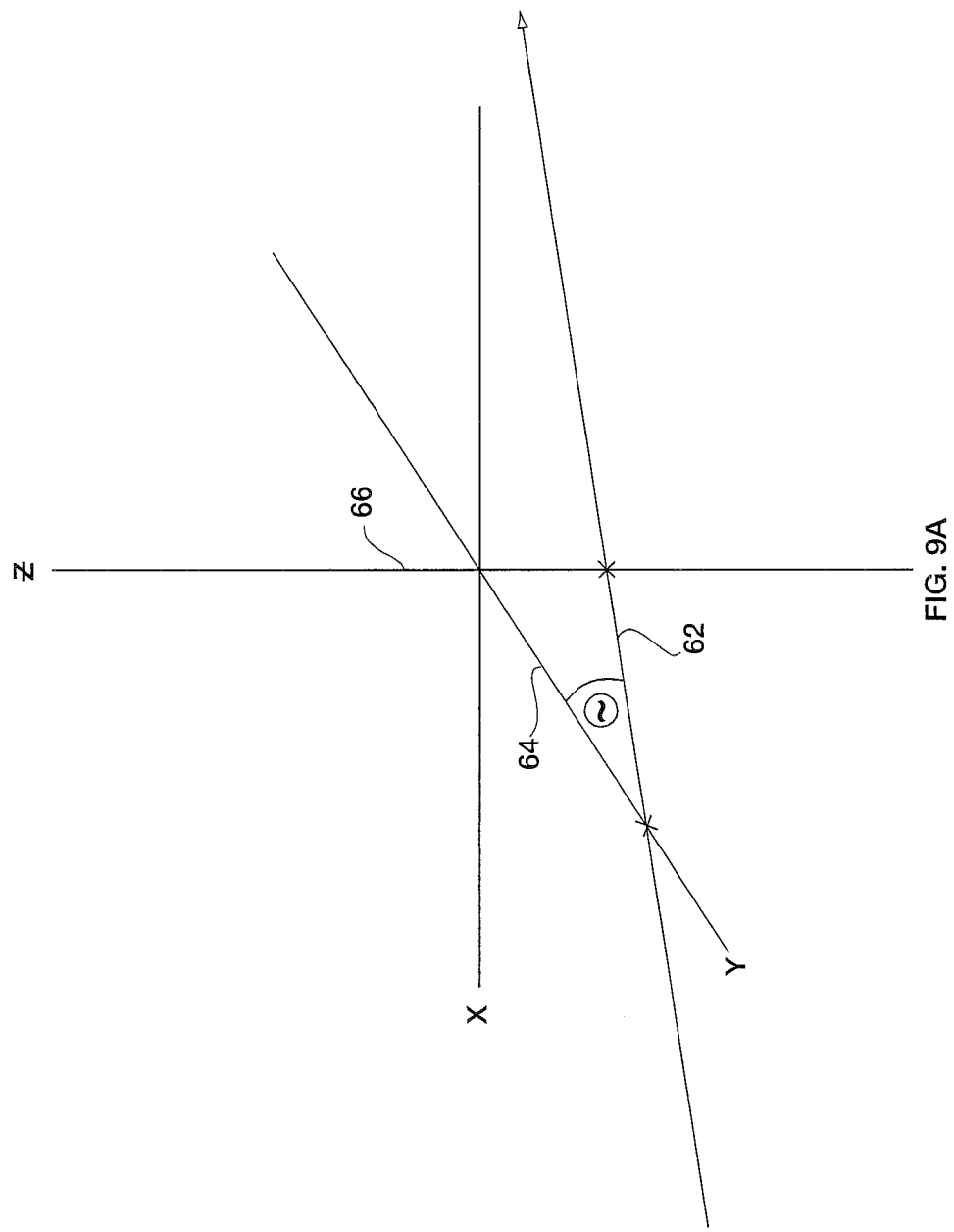

INDEPENDENT DISCHARGE SORTING CONVEYOR

RELATED APPLICATIONS

This application is a continuation application of U.S. application Ser. No. 13/529,584 filed Jun. 21, 2012, which is incorporated herein by reference in its entirety.

FIELD

The present inventions relate generally to package sorting conveyors and, more particularly, to a sorting conveyor having a tilting mechanism including at least one gear having at least one cam adapted for tilting the carrying tray toward at least one side of the conveyor.

BACKGROUND

Conveyor systems having a number of individual carrying carts have been commonly used for many years to carry and sort packages or other items, such as mail. For example, U.S. Pat. No. 5,054,601 to Sjogren et al. discloses a package sorting conveyor comprised of a train of tilt tray carriers coupled in tandem to form a continuous loop. Each carrier includes a pivotally mounted tilt tray normally maintained in an upright position. The carriers are moved around the loop by a series of motors spaced around the loop. Branching out from the loop are outfeed chutes or the like for receiving packages from the carriers. When a particular carrier holding a particular package to be sorted reaches a selected outfeed chute, an actuator tilts the tray to dump the package into the outfeed chute. Another example of a typical package sorting conveyor is disclosed in International PCT Application Number PCT/DK90/00047 of Kosan Crisplant A/S, now U.S. Pat. No. 5,664,660.

It is also known in the art to use an electric motor for each supporting unit for causing the tilting movement of each load carrying platform. However, there are acceleration, deceleration and mechanical resistance challenges associated with electronically powering the tilt of each load carrying platform. Each tilt must occur precisely at the right moment; the electric motor must accommodate for a relatively heavy load during tilt; and the tray must be able to recover rapidly to a neutral position.

Additionally, it is difficult to track the tilt and position of each of the trays to ensure that each cart is properly functioning, positioned and prepared to repeatedly tilt, recover and deliver packages to the outfeed chutes without delay.

Thus, Applicant's a need for a sorting conveyor which includes individual conveyor carts having a new and improved tilting mechanism that is adapted for tilting the carrying tray while, at the same time, determining the direction of tilt of the tray.

SUMMARY

The present inventions are directed to a sorting conveyor for transporting objects and unloading objects at one or more unloading stations adjacent the conveyor. The sorting conveyor includes a conveyor track and a train of conveyor carts connected end-to-end. At least one, including each, of the conveyor carts may include a frame base for engaging the conveyer track; a carrying tray for holding the objects; and a support for supporting the carrying tray above the frame base. A tilting mechanism including at least one gear having at least one cam is adapted for tilting the carrying tray toward at least one side of the conveyor. The present inventions may further include a tilt sensor for determining the direction of tilt of the tray. In addition, a drive motor and a driven member attached to the frame base may be included for moving the conveyor carts around the track.

In one embodiment, the tilt sensor includes a direction indicator wherein the direction indicator is configured to sense a reference area on the gear. The tilt sensor may be a dual sensor for carts tipping to more than one side of the conveyor.

In one embodiment, the tilt sensor may include a positioning indicator wherein the positioning indicator is configured to sense a reference area on the at least one gear. The positioning indicator may be a dual sensor for carts tipping to more than one side of the conveyor.

In the tilting mechanism, the at least one cam is rotatable around an axis of rotation of the at least one gear between about 0 degrees and about 360 degrees. In one embodiment, the at least one cam travels between about 0 degrees and about 140 degrees around the axis of rotation. In one embodiment, the cam moves toward about 0 degrees in response to the tilt sensor. In operation, rotation of the at least one cam in a first direction around an axis of rotation of the at least one gear tilts the tray in a direction toward one side of the conveyer.

The tilting mechanism may also include a second gear having a second cam. Each cam movement may respond to the tilt sensor and whereby the tilt sensor may monitor a reference area on the gears. In operation, at least one cam actuates the tray toward a neutral position when the tilt sensor determines a not home signal on at least one the gear.

In one embodiment, the support is a tiltable support having an incremental tilting response to rotation of the first and second cams about an axis of rotation. The tiltable support may include at least one camway for housing the first cam and the second cam. In one embodiment, the cams are rotatable substantially between about 0 degrees and about 25 degrees about an axis of rotation of each gear respectively. Also, in one embodiment, one of the cams may be housed within a camway within the tiltable support and the other cam may be outside of the camway within the tiltable support when the cams are rotated substantially between about 25 degrees and about 135 degrees about an axis of rotation of each gear respectively. In operation, the tiltable support tilts between about 40 degrees and about 50 degrees around the axis of tilt when the first cam and the second cam are rotated between about 120 degrees and about 140 degrees around the axis of rotation of each gear respectively.

In one embodiment, the axis of rotation of the first gear and the second gear is between about 0 degrees and about 360 degrees. In one embodiment, the first cam and the second cam may travel between about 0 degrees and 140 degrees around the respective axis of rotation. In one embodiment, the first cam rotates about between 0 and 140 degrees around the axis of rotation of the first gear and the second cam rotates about between 0 and 140 degrees around the axis of rotation of the second gear. In operation, rotation of the first cam in a first direction around an axis of rotation tilts the tray in a direction toward one side of the conveyer and wherein rotation of the second cam in a second direction around an axis of rotation tilts the tray toward an opposite side of the conveyer than the one side.

In one embodiment, the first cam and the second cam each rotate about an independent axis of rotation. In operation, rotation of the cams in a clockwise or counterclockwise direction is opposite the tilt of the tilt tray in a clockwise or counterclockwise direction.

The conveyor cart may further include at least one drive for actuating the tilting mechanism. In one embodiment, the drive is a gear drive for interacting with at least the first gear. Also, the tilting mechanism may be adapted so that each tray is independently dischargeable from the other trays in the conveyor train.

In one embodiment, the drive motor for moving the conveyor carts around the track may further include an opposed roller motor assembly for moving the conveyor carts on the conveyor track, the opposed roller motor assembly including a cantilevered, drive roller connected to one pivot block assembly and another pivot block assembly adapted for positioning the drive roller, wherein the pivot block assemblies are coupled together and adapted so that movement of each pivot block assembly mirrors movement of the other pivot block assembly. Also, the pivot block assemblies may be coupled together with a self-tensioning adjustment assembly including (i) at least one motor adjustment link affixed to one of the pivot block assemblies, (ii) a second link affixed to the other pivot block assembly, and (iii) a connecting roller link coupling the at least one motor adjustment link and the second link.

In one embodiment, the frame base may include a lower base portion attached to the conveyor track and the self-tensioning adjustment assembly. Also, the self-tensioning adjustment assembly may include a drive clamp plate connected to the lower base portion. In one embodiment, a lever may be connected to the self-tensioning adjustment assembly and adapted to adjust the pivot block assemblies. In one embodiment, the lever is adapted so that movement of each pivot block assembly mirrors movement of the other pivot block assembly.

Also, in one embodiment, the self-tensioning adjustment assembly includes a self-tensioning clamp plate for supporting the lever. The self-tensioning clamp plate may include a mounting bracket connecting a proximate end of the lever to the self-tensioning clamp plate. Also, the self-tensioning assembly may include a lever retainer affixed to the self-tensioning clamp plate to retain a distal handling end of the lever in an operating position. The self-tensioning assembly also may include a coupling arm connecting the lever and the connecting roller link. The self-tensioning assembly may further include a spring assembly between the coupling arm and the connecting roller link.

In one embodiment, the second link is a motor adjustment link.

In one embodiment, the drive roller assembly includes a generally cylindrical roller having an outer elastomeric surface for frictionally engaging the driven member extended fin. The elastomeric surface may be a polyurethane. In one embodiment, the polyurethane has a Shore A hardness between about 70 and about 80.

In one embodiment, the motor assembly includes a rotary motor and a drive belt connecting the motor and the drive roller, wherein the drive roller includes a frictional surface for receiving the drive belt. Also, in one embodiment, an opposing surface is adjacent to another surface of the driven member for off-setting the mechanical load of the drive roller in a second drive roller assembly. The second drive roller assembly may further include a second motor assembly.

In one embodiment, the driven member of the frame base comprises a fin moved in the conveyor line of travel by the opposed roller motor assembly. The opposed roller motor assembly and the fin may both be vertically oriented beneath the trailer frame base. In one embodiment, the fin is generally parallelogram-shaped with rearwardly angled front and rear edges.

Accordingly, one aspect of the present inventions is to provide a sorting conveyor for transporting objects and unloading objects at one or more unloading stations adjacent the conveyor, the sorting conveyor comprising: (a) a conveyor track; (b) a train of conveyor carts connected end-to-end; and (c) at least one of the conveyor carts including (i) a frame base for engaging the conveyer track; (ii) a carrying tray for holding the objects; (iii) a support for supporting the carrying tray above the frame base; and (iv) a tilting mechanism including at least one gear having at least one cam for tilting the carrying tray toward at least one side of the conveyor.

Another aspect of the present inventions is to provide in a sorting conveyor for transporting objects and unloading objects at one or more unloading stations adjacent the conveyor, the sorting conveyor having a conveyor track and a train of conveyor carts connected end-to-end, at least one of the conveyor carts comprising: (a) a frame base for engaging the conveyer track; (b) a carrying tray for holding the objects; (c) a support for supporting the carrying tray above the frame base; (d) a tilting mechanism including at least one gear having at least one cam for tilting the carrying tray toward at least one side of the conveyor; and (e) a tilt sensor for determining the direction of tilt of the tray.

Still another aspect of the present inventions is to provide a sorting conveyor for transporting objects and unloading objects at one or more unloading stations adjacent the conveyor, the sorting conveyor comprising: (a) a conveyor track; (b) a train of conveyor carts connected end-to-end; (c) at least one of the conveyor carts including (i) a frame base for engaging the conveyer track; (ii) a carrying tray for holding the objects; (iii) a support for supporting the carrying tray above the frame base; (iv) a tilting mechanism including at least one gear having at least one cam for tilting the carrying tray toward at least one side of the conveyor; and (vi) a tilt sensor for determining the direction of tilt of the tray; and (d) a drive motor and a driven member attached to the frame base for moving the conveyor carts around the track.

These and other aspects of the present invention will become apparent to those skilled in the art after a reading of the following description of the preferred embodiment when considered with the drawings.

BRIEF DESCRIPTION OF THE DRAWINGS

FIG. 4 is a side view of one embodiment of the tilting conveyor cart shown in FIG. 2;

FIG. 9 is a side view of one embodiment of a tilting conveyor cart;

FIG. 9A is a geometric depiction of one embodiment of the conveyor cart pivot axis and conveyor line of travel as they relate to three-dimensional X,Y,Z spatial coordinates;

DETAILED DESCRIPTION OF EMBODIMENTS

Figure 1:
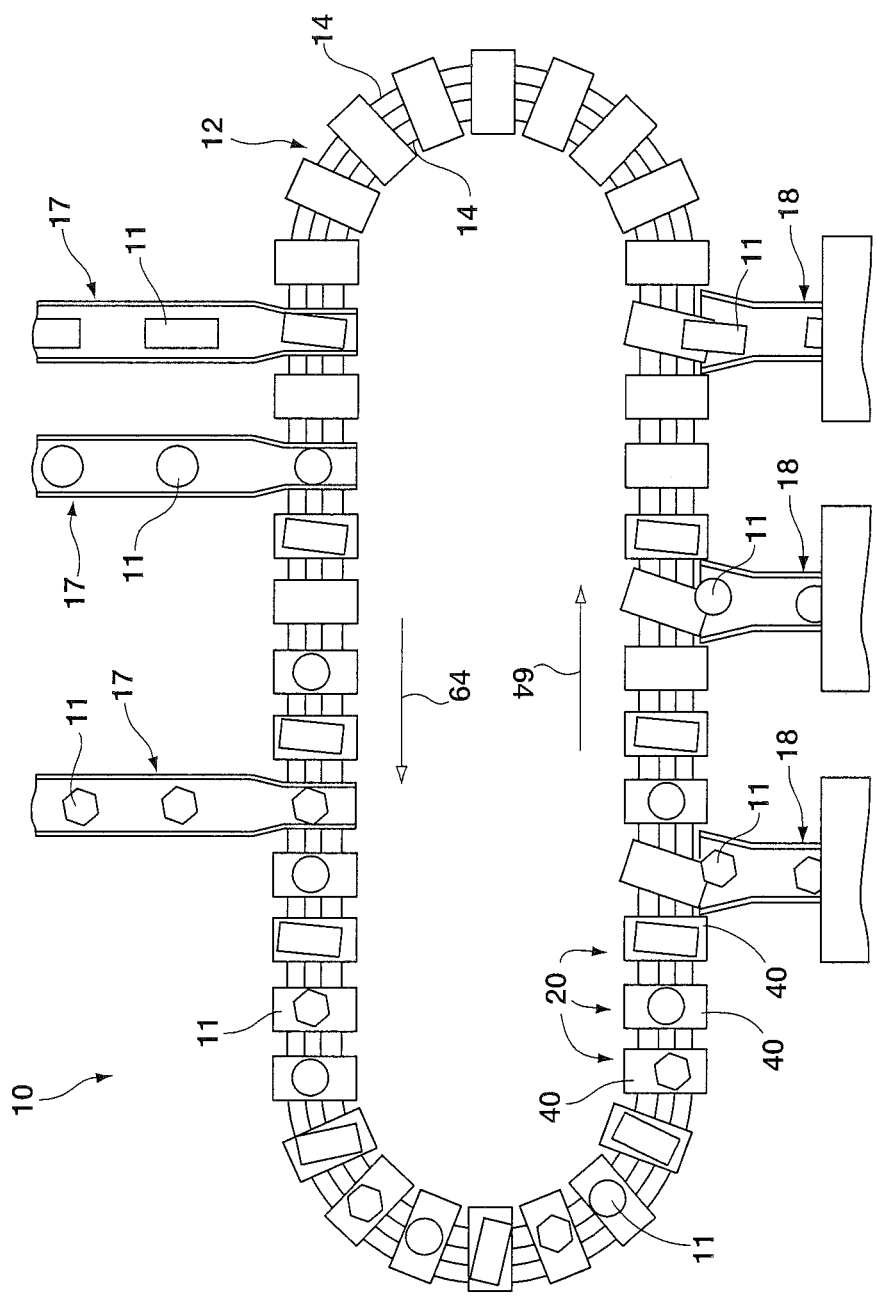
FIG. 1 is a schematic depiction of one embodiment of a package sorting conveyor constructed according to the present inventions.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 2:
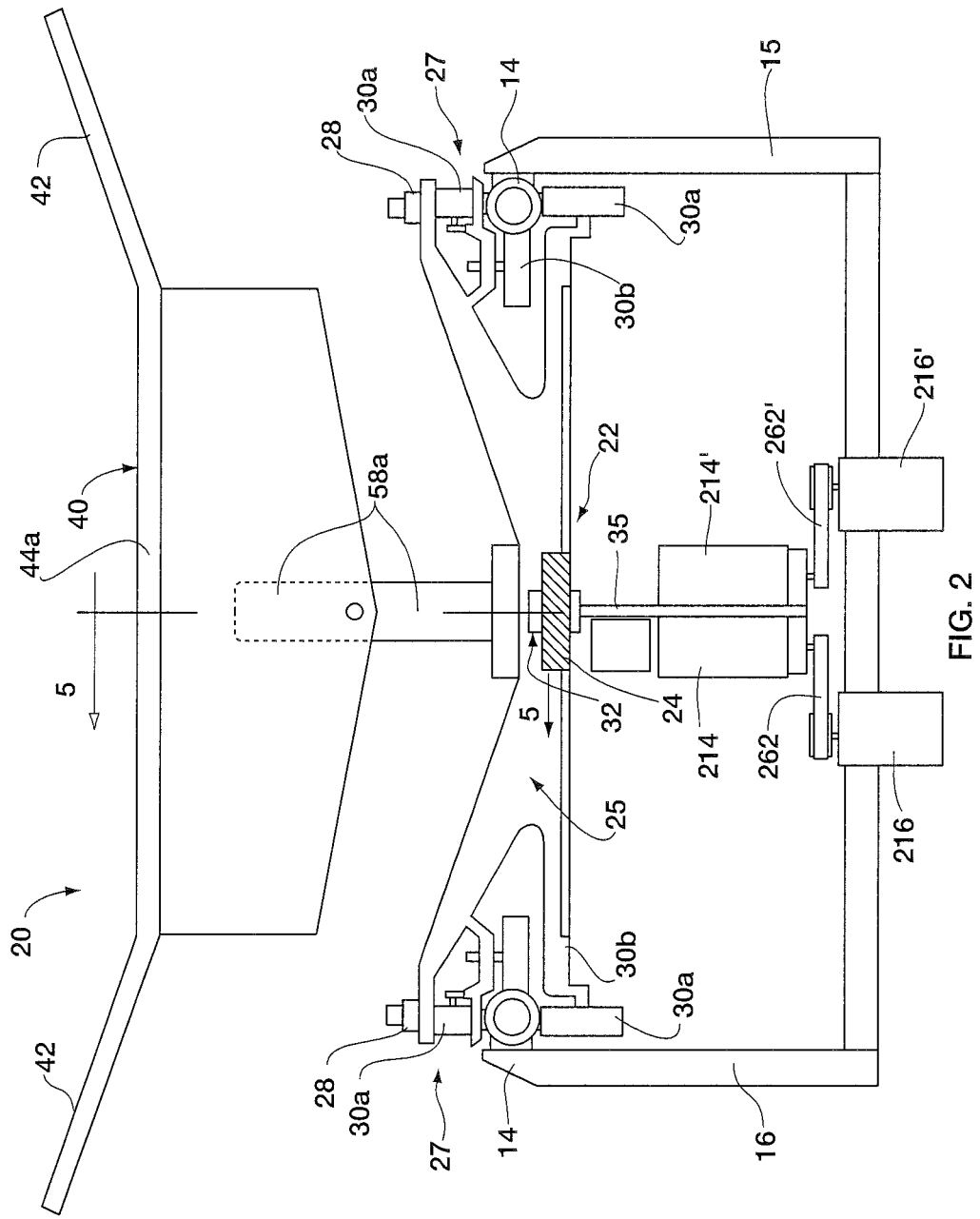
FIG. 2 is front elevational view of a single tilting conveyor cart of a package sorting conveyor and an opposed roller motor assembly of the conveyor.
Figure 3:
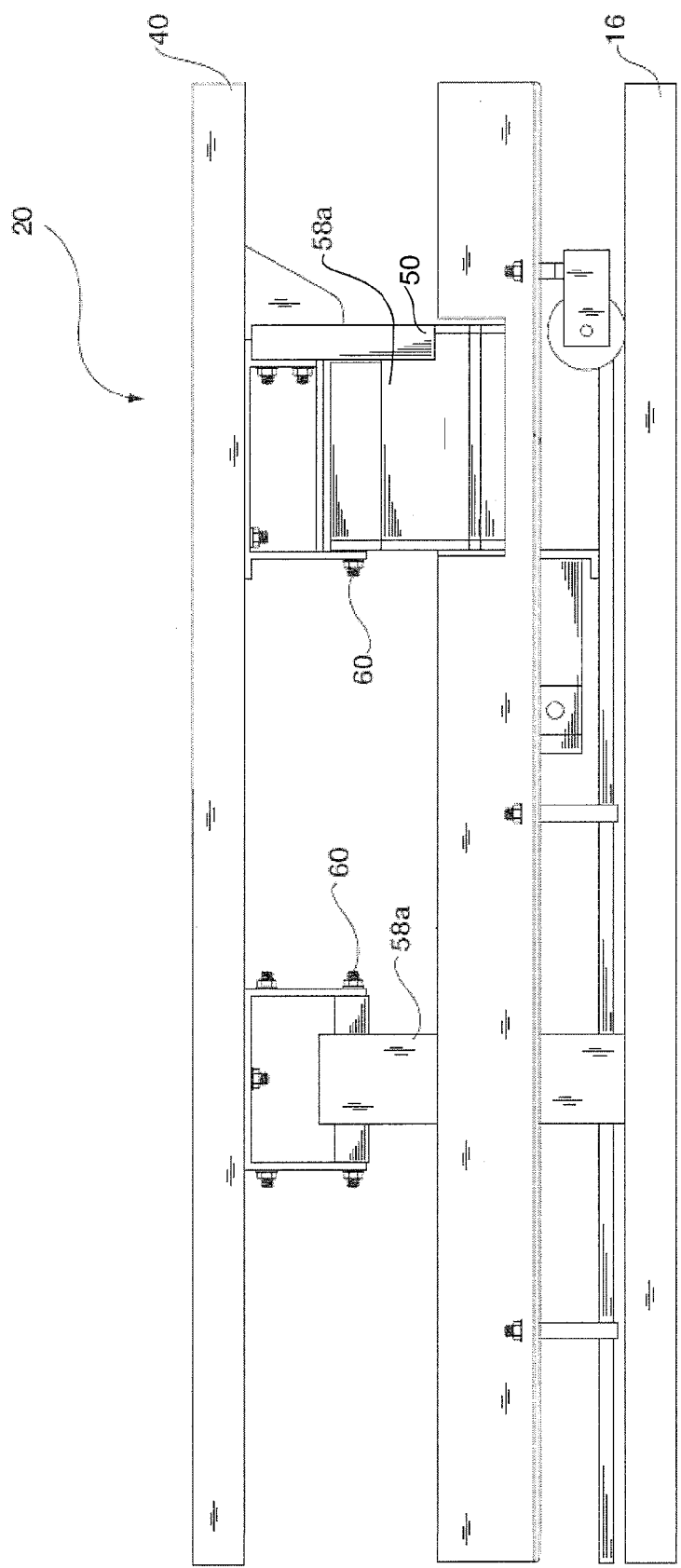
FIG. 3 is a side view of one embodiment of the tilting conveyor cart shown in FIG. 2, which also shows the tiltable support apparatus of the tilting conveyor cart of the inventions.

Referring now to the drawings in general and FIGS. 1, 2 and 3 in particular, it will be understood that the illustrations are for the purpose of describing embodiments of the inventions and are not intended to limit the inventions thereto. As best seen in FIG. 1, a sorting conveyor, generally designated 10, is shown constructed according to the present inventions for transporting and sorting packages 11 or other objects. The sorting conveyor 10 comprises a train of individual carts 20, connected end to end, which may form an endless loop around a closed-circuit conveyor track 12. Alternately, the conveyor carts 20 of the inventions could be used singly or as part of a finite train.

The sorting conveyor 10 generally includes a conveyor track 12 and the train of conveyor carts 20 that are generally moved around the track by one or more drive motors (not shown in FIG. 1). Each of the conveyor carts typically includes a frame base 22 for engaging the conveyer track; a carrying tray 40 for holding the objects; a support 58a for supporting the carrying tray above the frame base; and a tilting mechanism 50 for tilting conveyor carts 20 to discharge packages 11 therefrom. Typically, any number of unloading stations or outfeed chutes 18, which are adjacent the package sorting conveyor 10 on one or both sides thereof, receive the packages 11 discharged from the sorting conveyor 10 and carry the packages to waiting storage bins, trucks, etc. Packages may be manually placed on the conveyor carts 20 or may be delivered to the sorting conveyor 10 via infeed chutes 17 or the like.

The conveyor track 12 includes two parallel rails 14 and may be built to conform to the layout of any warehouse, shipping center, distribution center or the like. Best seen as resembling the track of a roller coaster, the conveyor track 12 may be substantially horizontal or may ascend and descend. The conveyor track rails 14 may lie in the same horizontal plane, or one may be higher than the other, such as would be the case in a banked curve in the track 12. Banked curves are greatly advantageous because they allow the conveyor carts 20 to move around a curved conveyor track 12 at a much greater speed without spilling packages 11 than on a flat track. Typically, the rails 14 are generally tubular, again similar to a roller coaster, and are supported by rail support members 16 only on the outwardly facing edges of the rails. The rails 14 may typically be round, however, may also be rectangular or take on other shapes in cross-section.

Now turning to the train of conveyor carts 20, each cart 20 generally may include: a trailer frame base 22, a generally horizontally disposed carrying tray 40 for holding the packages 11, and a support 58a for supporting the carrying tray 40 above the trailer frame structure 22 and for allowing tilting of the carrying tray 40 towards either side of the sorting conveyor 10 to unload a package into one of the unloading stations. Each cart 20 is built around the trailer frame base 22 to which other components of each cart 20 are mounted. As shown in FIGS. 2 and 4, the trailer frame structure 22 includes a longitudinal base member 24 that extends in the rearward direction of conveyor travel 64 between the two parallel rails 14. Preferably, the base member 24 is substantially equidistant from each rail 14.

A roller structure 26 for riding on the conveyor track 12 is mounted on a front end of the base member 24 and includes two laterally extending cam follower mechanisms 27, one for each rail 14. The reason for the outboard placement of the rail supports 16 and the tubular shape of the rails 14 becomes apparent upon examining the cam follower mechanisms 27. Each cam follower mechanism 27 may include three cam followers: an upper cam follower 30a for riding on the top edge of the rail 14, a middle cam follower 30b for riding on an inside edge of the rail 14, and a lower cam follower 30c for riding on the bottom edge of the rail 14. With this configuration, it is almost impossible for a cart 20 to jump the track 12, because a wheel is provided for each directional force (sideways, upward and downward) that a cart 20 may encounter when traveling along the track 12. Preferably, each cam follower 30a, 30b and 30c is constructed of a somewhat resilient material such as polyurethane to provide for smooth, quiet, relatively vibration-free operation of the sorter conveyor 10.

The structure of one embodiment of each cam follower mechanism 27 that holds the top wheel 30a is shown in greater detail in U.S. Pat. No. 5,836,436, which is herein incorporated by reference in its entirety. Each top cam follower 30a is retained by an axle caster 28 that is preferably formed from extruded aluminum or the like. The axle caster 28 includes two forks, one on each side of the wheel 30a, and a bearing bore disposed at the juncture of the two forks which has an opening on one side so that the bearing bore communicates with the space between the forks. A pair of flange bearings seated in the bearing bore are disposed around an axle shaft extending from the roller structure 26. Preferably formed of an Oilite® metal alloy or other friction-reducing material, each flange bearing has the form of a top-hat bushing and includes a center hole through which passes the axle shaft. The cam follower 30a is held in place between the two forks by a bolt and nut. Preferably, the cam follower 30a includes a bearing structure disposed around the bolt, which serves as an axle running through the center of the wheel 30a.

The axle caster 28 of the present inventions provides that the flange bearings can easily be slid into place by hand into the bearing bore 28 without using a press. Then, to immovably secure the flange bearings inside the bearing bore, the forks are slightly flexed inwardly towards each other as the nut is tightened onto the bolt to hold the wheel 30a in place. The forks of the axle caster are therefore formed minutely wider apart than would be necessary to merely hold the wheel 30a. When the forks are flexed inwardly towards each other by tightening the nut on the bolt, the opening of the bearing bore is closed somewhat and the bearing bore is itself slightly distorted, securely retaining the flange bearings therein. The flange bearings themselves are, however, not significantly distorted and are free to swivel back and forth on the axle shaft. Therefore, the flange bearings can easily and immediately be replaced on-site when worn, eliminating much down-time that would be required if conventionally designed axle casters were used in the conveyor cart 20 of the present invention.

Adjacent carts 20 in the train are connected together using hitch mechanisms 32. Each hitch mechanism 32 as including a front hitch mounted on the front end of the base member 24 in front of the roller structure 26 and a rear hitch mounted on the rear end of the base member. In one embodiment, each hitch 32 has a vertical throughbore, through which a hitch pin connector is inserted. The hitch mechanisms 32 may be configured so that the front hitch on a rearward cart is disposed overtop of the rear hitch on a forward cart. In the alternative, the hitch mechanisms 32 may comprise a polydirectional spherical ball joint mechanism similar in structure to an automotive trailer hitch. In either case, friction between hitch mechanism components is preferably reduced by, for example, lining the hitch components with TEFLON® polymer or other relatively low-friction material.

To prevent adjacent conveyor carts 20 from separating should the hitch mechanism 32 accidentally break or become uncoupled, an auxiliary cart connector 34 is preferably connected between the trailer frame structures 22 of adjacent carts 20. The auxiliary cart connector 34 may be a metal cable or lanyard, although other high-tensile strength materials could be used. In the embodiment depicted, the auxiliary cart connector 34 is an approximately 3/16th inch thick metal cable connected to adjacent trailer frame structures 22 with metal mounting connectors 34a.

The primary reason that metal is the preferred material for the auxiliary cart connector 34, besides its strength, is so that the auxiliary cart connector 34 will also serve as a continuous electrical connector between adjacent carts 20. Electrical continuity between carts 20 is important because of static electricity build-up while the carts 20 are traveling around the conveyor track 12. However, because the cam followers 30a, 30b and 30c are preferably formed of polyurethane (an electrical insulator) and because the components of the hitch mechanism 32 are preferably coated with TEFLON® polymer (also an electrical insulator), electrical continuity between adjacent carts 20 may not otherwise be effectively achieved. By electrically connecting the carts 20, static charges can be bled off from the train, for safety and operational considerations. Thus, the auxiliary cart connector 34 serves two purposes: first, it physically attaches two adjacent conveyor carts 20 and prevents them from becoming completely separated should the hitch mechanism 32 fail; second, it enables electrical continuity among all of the conveyor carts 20 in the train.

Even without the auxiliary connector cable 34, only the rear end of the trailer frame structure 22 will drop below the conveyor track 12 upon accidental disengagement of the hitches or upon breakage of the hitch mechanism 32. Therefore, instead of the front end 36a of the driven fin 36 digging into the floor sides or underlying structures below the conveyor, as is the case with prior art conveyors, the driven fin 36 will simply be dragged with relatively minimal damage should one of the hitches 32 break or become accidentally uncoupled. If an auxiliary connector cable 34 is attached between two adjacent carts 20 that break apart, the connector cable 34 will limit the distance that the rear end of the trailer frame structure 22 will drop, further limiting damage.

Mounted atop the trailer frame base 22 of each conveyor cart 20 is the support 58a, which supports the carrying tray 40 thereabove. There may be one or more supports 58a.

In one embodiment, as best seen in FIGS. 3 and 4, the support structure 58a may be a generally planar member that lies in the vertical plane parallel to the conveyor line of travel 64. In one example, the support may include a pivot structure 60 and/or could take on the form of a hinge structure joining together two generally planar support structures, one 52 attached to the tray 40, and one 58a extending from the frame base 22.

As can be seen in the drawings, the tray 40 may be planar or may also include upwardly angled lateral wings 42 to help prevent packages 11 from accidentally falling off the tray 40. These wings 42 also decrease the angle of the slope created when the tray 40 is tilted, which helps with gentle handling of the packages 11 as they are discharged from the cart 20.

When a carrying tray 40 reaches a particular destination unloading station 18, the tilting mechanism 50 tilts the carrying tray 40 to cause a package 11 carried thereon to be discharged into the unloading station 18. A tilting mechanism 50 is generally mounted on each conveyor cart 20.

Figure 5A:
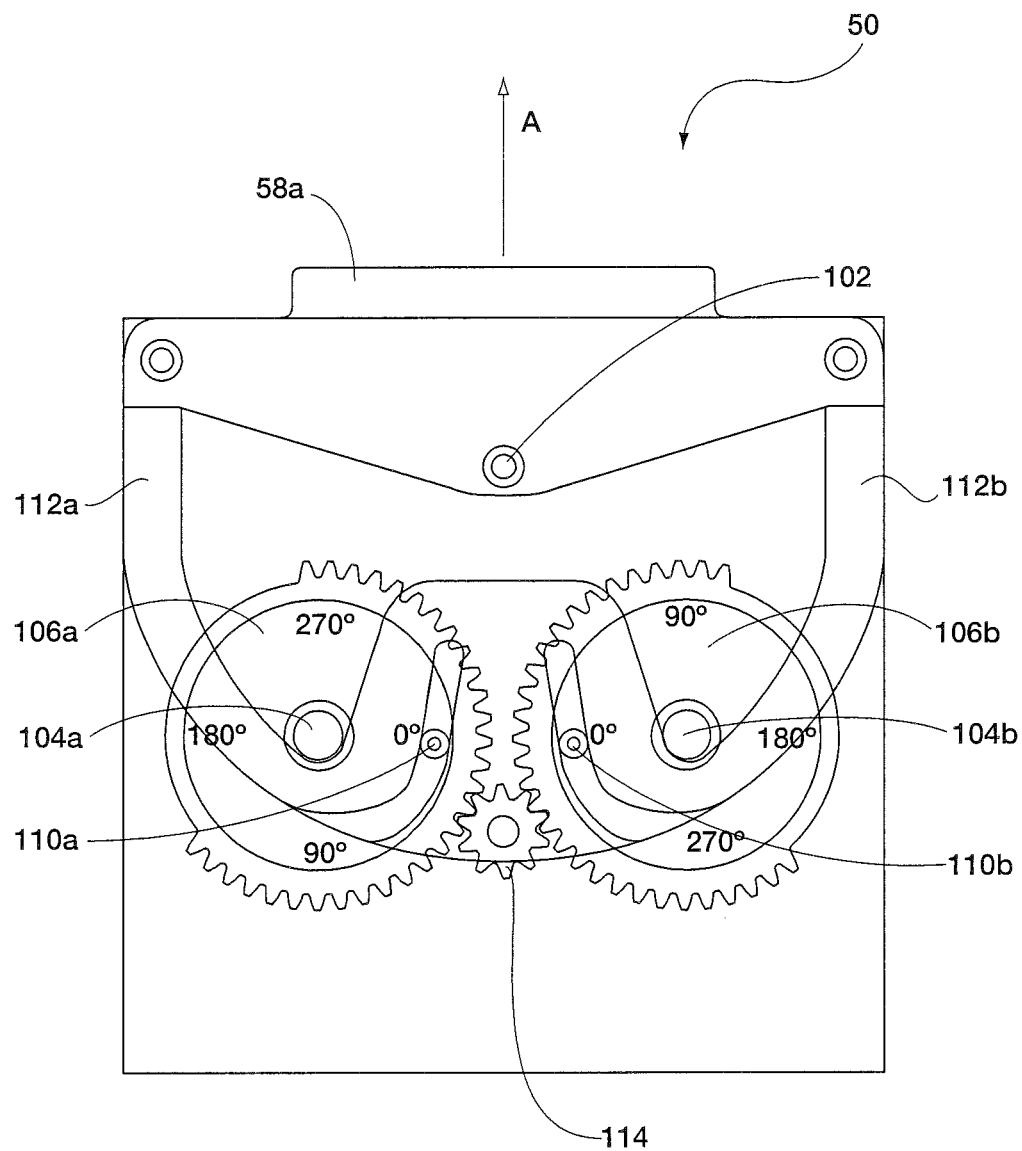
FIGS. 5A-5E show a tilting mechanism in different positions as the carrying tray tilts toward at least one side of the conveyor.
Figure 5B:
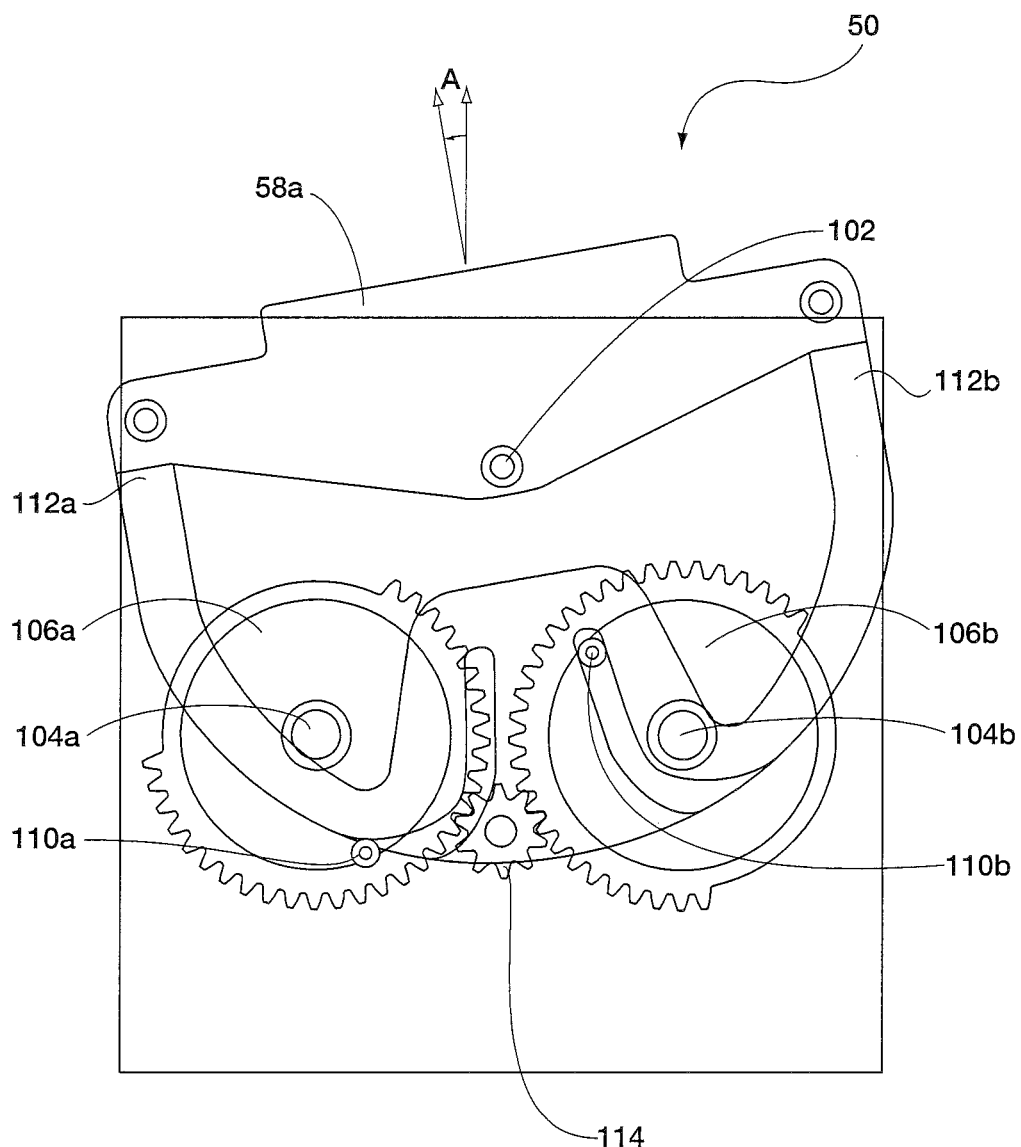

FIG. 5A shows one embodiment of the tilting mechanism 50 including at least one gear 106a having at least one cam 110a for tilting the carrying tray 40 toward at least one side of the conveyor. The tilting mechanism 50 is typically mountably attached to a portion of the cart 20, usually the support 58a, and engages with a camway 112a. The camway 112a may be at least partially housed within a support 58a. The cam 110a may be rotatable around an axis of rotation 104a between about 0 and about 360 degrees. The cam 112a may travel to varying degrees around the axis of rotation 104a, for example, between about 0 and 140 degrees, 0 and 120 degrees, 0 and 90 degrees and/or a combination or other degrees in between.

In another embodiment, the tilting mechanism 50 may further include an extension or camway 112a or second camway 112b, a second gear 106b having a second cam 110b, wherein the second cam 110b is rotatable around an axis of rotation 104b between about 0 and about 360 degrees. The cam 110b may travel to varying degrees around the axis of rotation 104b, for example, between about 0 and 140 degrees, 0 and 120 degrees, 0 and 90 degrees and/or a combination or other degrees in between.

In FIG. 5A, a tillable support 58a is shown in a substantially non-tilted position on the axis of tilt 102. In this position, the support 58a is supporting the tray 40 in a substantially neutral position. The support 58a may include one or more camways 112a and 112b extending substantially horizontally and/or substantially vertically throughout the mechanism 50. The cams 110a and 110b move within and/or without the camways 112a and 112b, respectively, as the gears 106a and 106b are rotated around their axis of rotations 104a and 104b when movement is activated by a gear drive 114. As the cams 110a and 110b move within the camways 112a and 112b, the tiltable support, and thus the supported tray 40, is tilted around the axis of tilt 102.

Figure 6A:
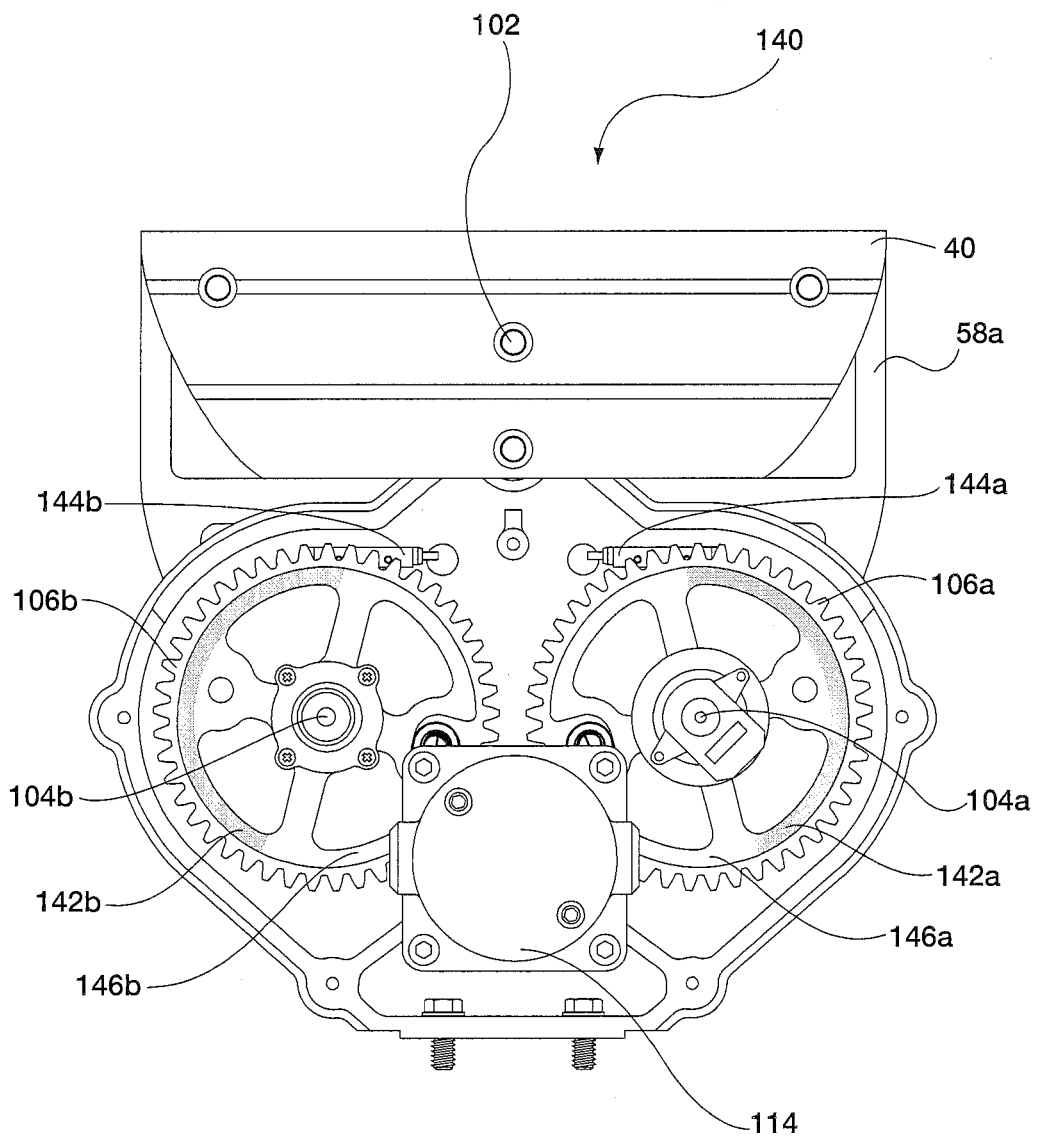
FIG. 6A shows one embodiment of a tilt sensor when the tray is in a neutral position.

As seen in FIG. 6A, the conveyor cart 20 may also include a tilt sensor 140 for determining the direction of tilt of the tray 40. The tilt sensor includes switch 144a. The tilt sensor may be a dual tilt sensor and include switches 144a and 144b. The tilt sensor may also include an array of switches. The tilt sensor 140 may be adapted to operate as a direction indicator. The tilt sensor 140 may also or otherwise be adapted to operate as a positioning indicator. The tilt sensor 140 may be configured to sense a reference area 142a/142b on a corresponding gear 106a/106b.

The switches 144a and 144b may be, by way of example, non-contact sensors that operate in a closed, and alternatively, an open position. As will be recognized by one of skill in the art, a variety of sensors may operate to provide similar feedback about reference areas on one or more gear, however, shown, to provide an example, in FIG. 6A are switches 144a and 144b that close upon the presence of a metal reference point 142a and 142b and remain open when in the presence of a non-metal reference point 146a and 146b.

Figure 7:
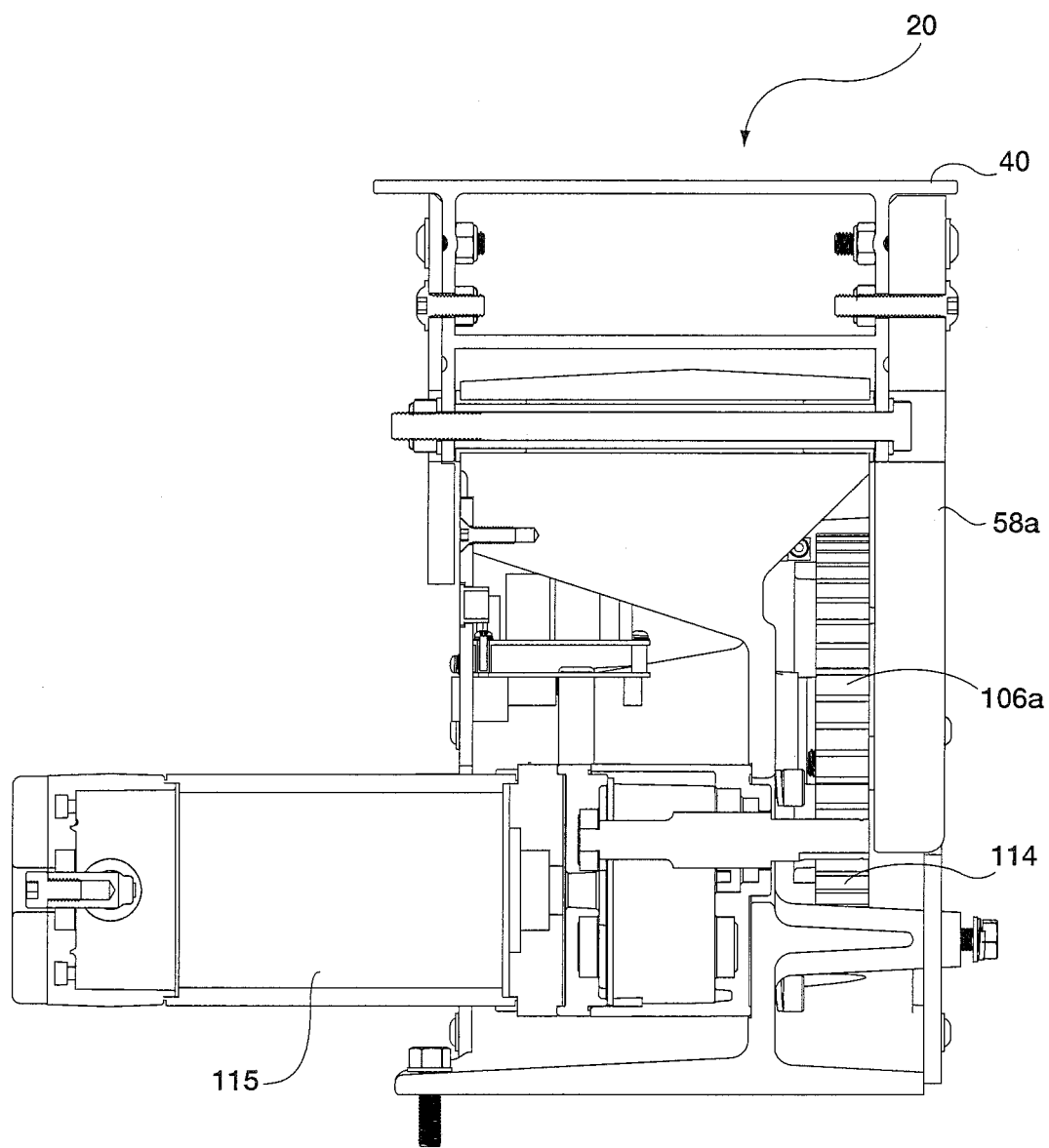
FIG. 7 is a cross-sectional side view of one embodiment of the tilting mechanism of the present inventions.

FIG. 7 shows a cross sectional side view, inter alia, of the cart 20 including the tray 40, the support 58a, the gears 106a, the gear drive 114 and the drive device 115.

Referring to FIGS. 5A-5E and 6A-6C generally, in operation, the switches provide feedback that may be processed to determine and control the direction of tray tilt and/or the positioning of the tray. In FIG. 5A it can be seen that when the tray 40 (as a result of the support 58a) is in a neutral position, the cams 110a and 110b are at about 0 degrees about the axis of rotation 104a and 104b. At the 0 degrees position, both cams 104a and 104b are both located inside a substantially vertical portion of the camways 112a and 112b. With both cams 112a and 112b in this position, the tray is locked in a neutral, mostly horizontal, position. This locked structural positioning serves to keep the tray locked in a neutral position even in the event of power failure or mechanical malfunction and prevents errant and unintended deposition of packages 11.

When it is desirable for the tray to be tilted, the gear drive 114, powered by a drive device 115, may be actuated in a clockwise or counterclockwise direction. If the drive gear 114 actuates in a clockwise direction, then the gears 106a and 106b will turn about their axis of rotation 104a and 104b in a counter clockwise direction and cause the tray 40 to tilt in the clockwise direction, or same direction as the rotation of the drive gear and vice versa.

Figure 6B:
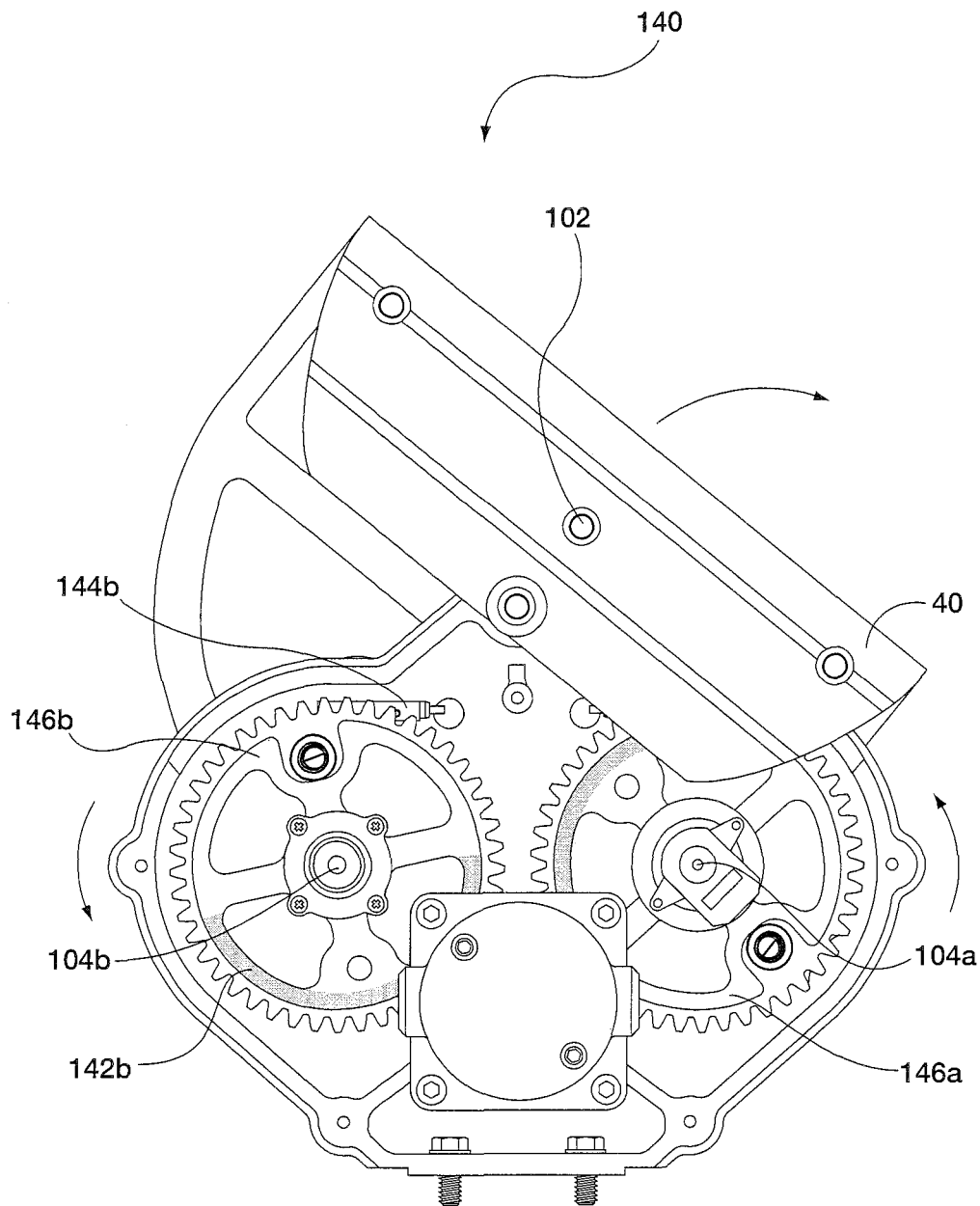
FIG. 6B shows one embodiment of a tilt sensor when the tray is in a tilted position.

In FIG. 6B, the drive gear is shown actuating in a counterclockwise direction and causing the gears 106a and 106b to turn about their axis of rotation in an opposite, clockwise direction. As the gears begin to rotate, the associated cams 110a and 110b also rotate and move along their respective camways 112a and 112b. Movement of the cams in the camways allows the support to tilt along the pivot axis. Rotation clockwise of the gears causes upward movement of cam 110b in camway 112b and downward movement of cam 110a in camway 112a. At approximately 45 degrees of rotation, the cam 110b has reached the peak of camway 112b while the cam 110a has begun to exit the internal camway 112a located within the support 58a. As can be seen, this configuration allows for significant movement of the cams within the camways prior to instigating tilting of the support 58a and the tray 40. When the trays begin to tilt, the tilting mechanism 50 may come under significant load attempting to deposit packages 11. Applicant has found that allowing the drive gear to ramp up movement prior to experiencing the load during tilt, may significantly increase efficiency and accuracy of the tray tilt. Applicant also recognizes that ramping down movement, for example the drive gear, prior to returning the tray to the neutral position, may contribute to increased efficiency and accuracy of the tray tilt as well.

Figure 5C:
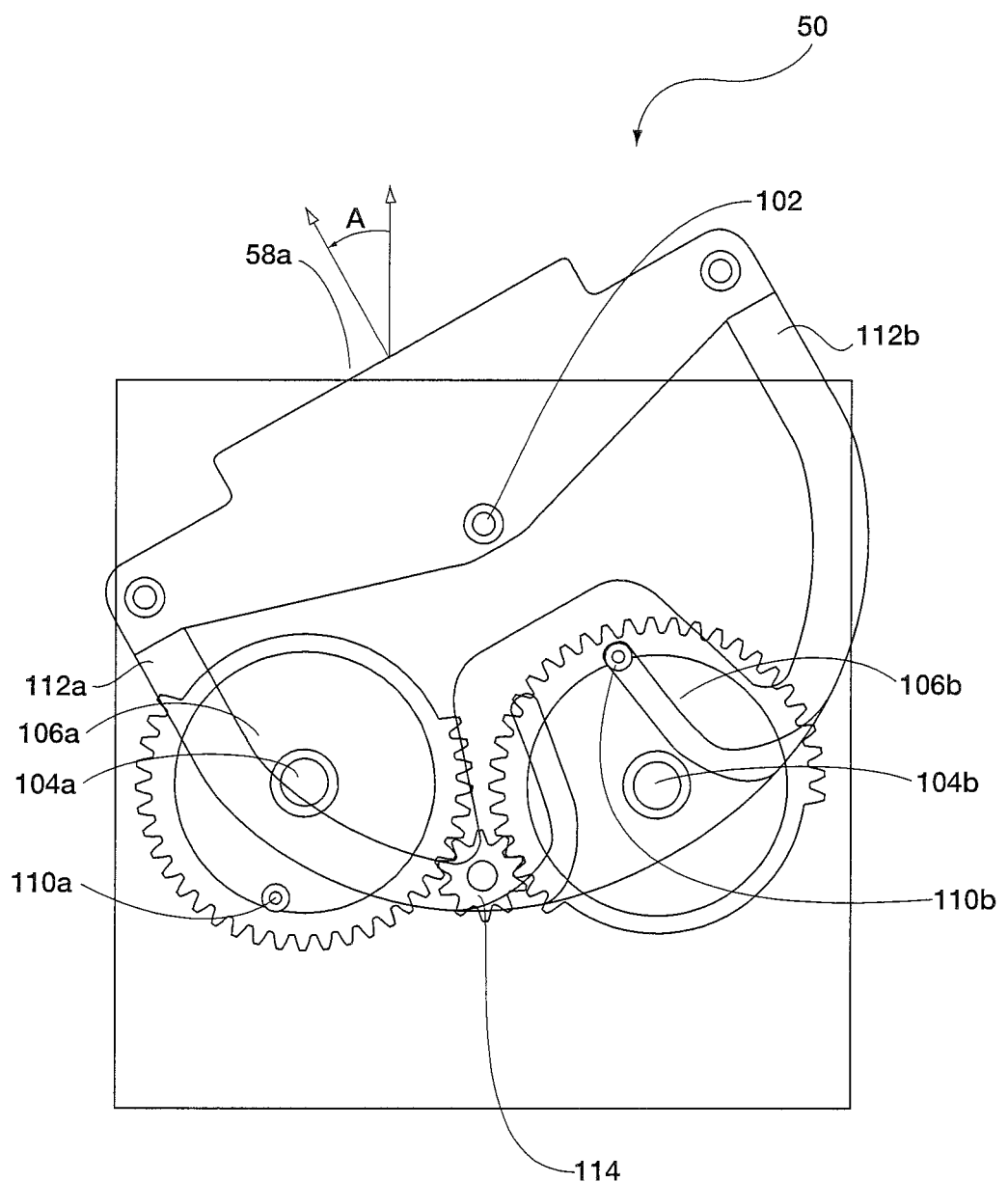
Figure 5D:
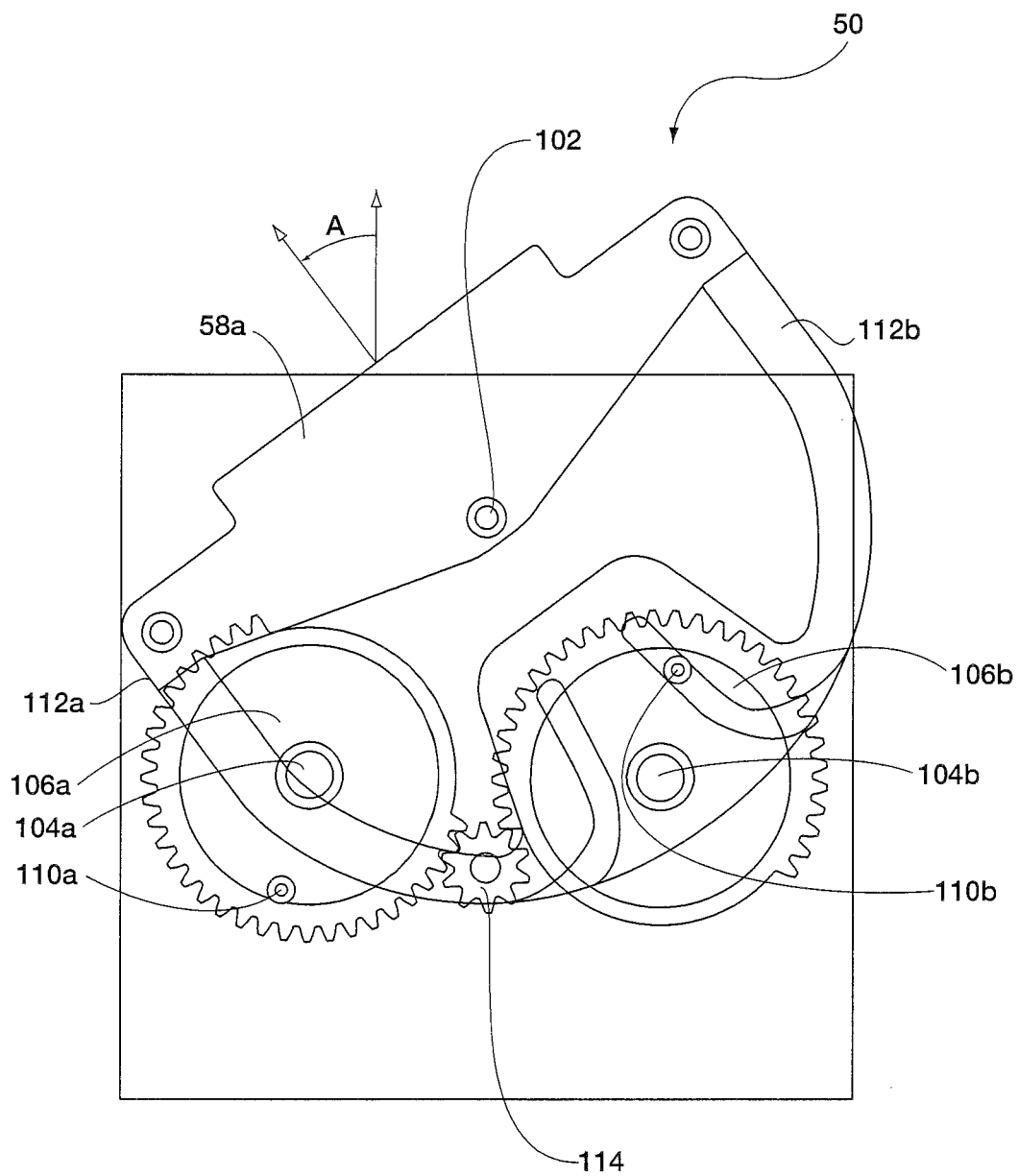
Figure 5E:
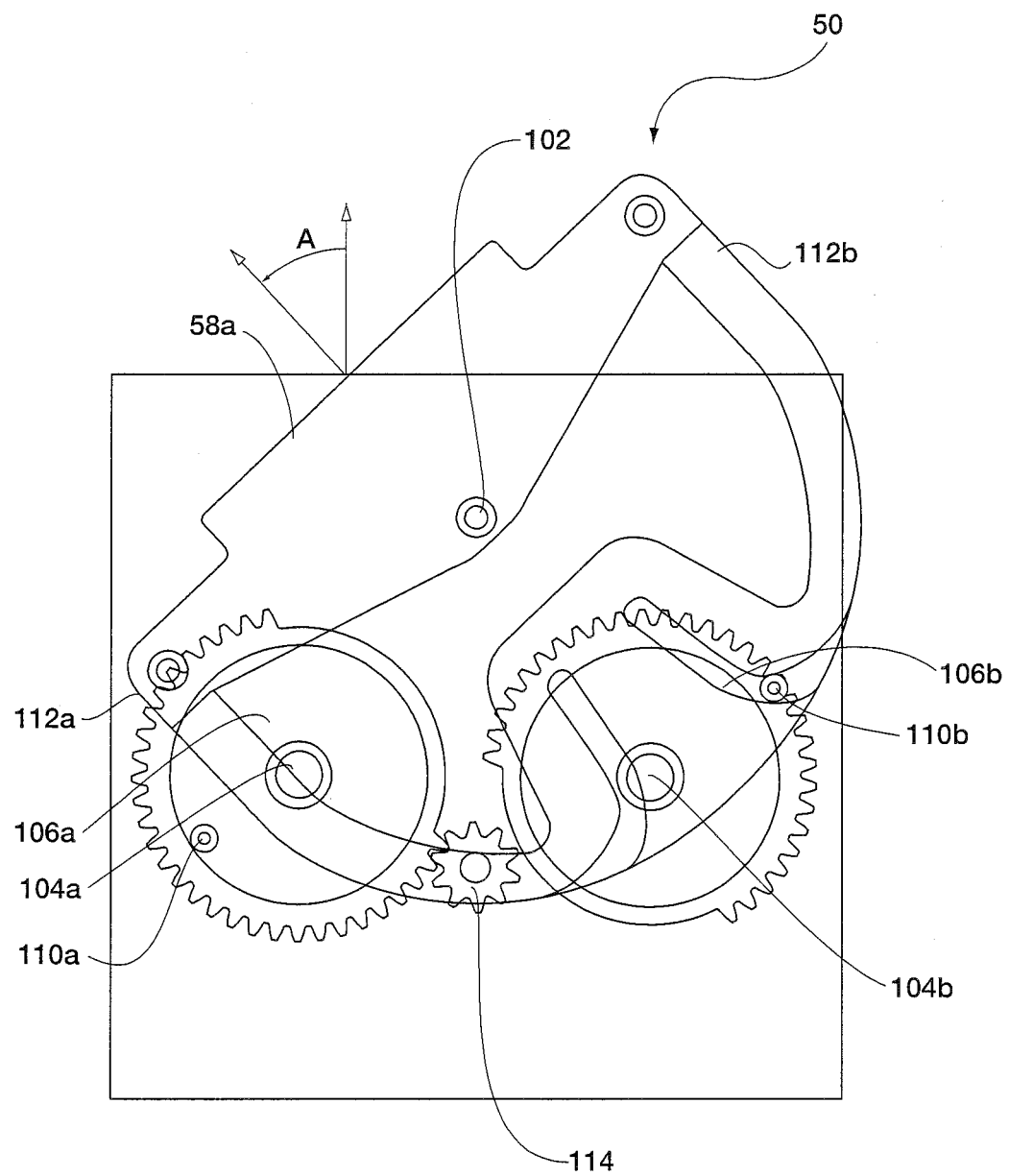

FIGS. 5C, 5D and 5E show continued clockwise movement of the gears 106a and 106b by approximately 90 degrees so that cam 110a has traveled downward in camway 112a and proceeded substantially horizontally to exit the internal camway. Cam 110b originally proceeding upward in its camway, is now directed to move back down the camway and out into an extreme position at approximately 135 degrees of gear rotation allowing for left (or counterclockwise) tilt of the tray 40 to about 45 degrees from its neutral position, adequate for depositing a package 11 carried on the tray 40. This movement allows the drive gear 114 to ramp down as the tray reaches maximum tilt and the gears 106a and 106b approach maximum rotation sufficient to accomplish desired tray tilt. The gears 106a and 106b operate in a reverse fashion about the axis of rotation 104a and 104b to return the cams to the idle state where the tray 40 is locked in a neutral position.

In the field of sorting conveyors, Applicant has identified a demand for conveyors that can operate more efficiently, deliver goods more effectively and reduce cart and delivery error. The tilting mechanism 50 of Applicant's inventions, functions to reduce acceleration and deceleration load effects on the gears, the gear drive, and gear device. Variables such as velocity and acceleration of the tilting mechanism during delivery and recovery not only affect the ability to deposit the package accurately but also the efficiency of the sorting conveyor 10 in whole. By way of example, management of these variables may be as seen below to accomplish efficient and effective tilt of the tray to substantially forty-five degrees.

TABLE1 I

45 DEGREE P-TILT

| Tip profile | 500 [Milli sec] |
| Tray width | 40 inches |
| Tilt degrees | 45 Degrees |
| Radius from pivot | 20.49 inches (assume 1" thick tray spacer) |
| Arc length | 16.09 inches |

| Gear rotation [degrees] | Tilt Angle [degrees] | Time [milli sec] | Velocity [in/sec] | Acceleration [in/sec$^2$] |
| --- | --- | --- | --- | --- |
| 0 | 0 | 0 | 0.00 | 0.00 |
| 13.5 | 0.73 | 50 | 6.18 | 10.30 |
| 27 | 3.18 | 100 | 20.74 | 24.27 |
| 40.5 | 7.73 | 150 | 38.52 | 29.63 |
| 54 | 14.4 | 200 | 56.47 | 29.91 |
| 67.5 | 22.5 | 250 | 68.58 | 20.18 |
| 81 | 30.6 | 300 | 68.58 | 0.00 |
| 94.5 | 37.27 | 350 | 56.47 | 20.18 |

TABLE1 I-continued

| 45 DEGREE P-TILT | | | | |
|---|---|---|---|---|
| 108 | 41.82 | 400 | 38.52 | 29.91 |
| 121.5 | 44.27 | 450 | 20.74 | 29.63 |
| 135 | 45 | 500 | 6.18 | 24.27 |

Figure 6C:
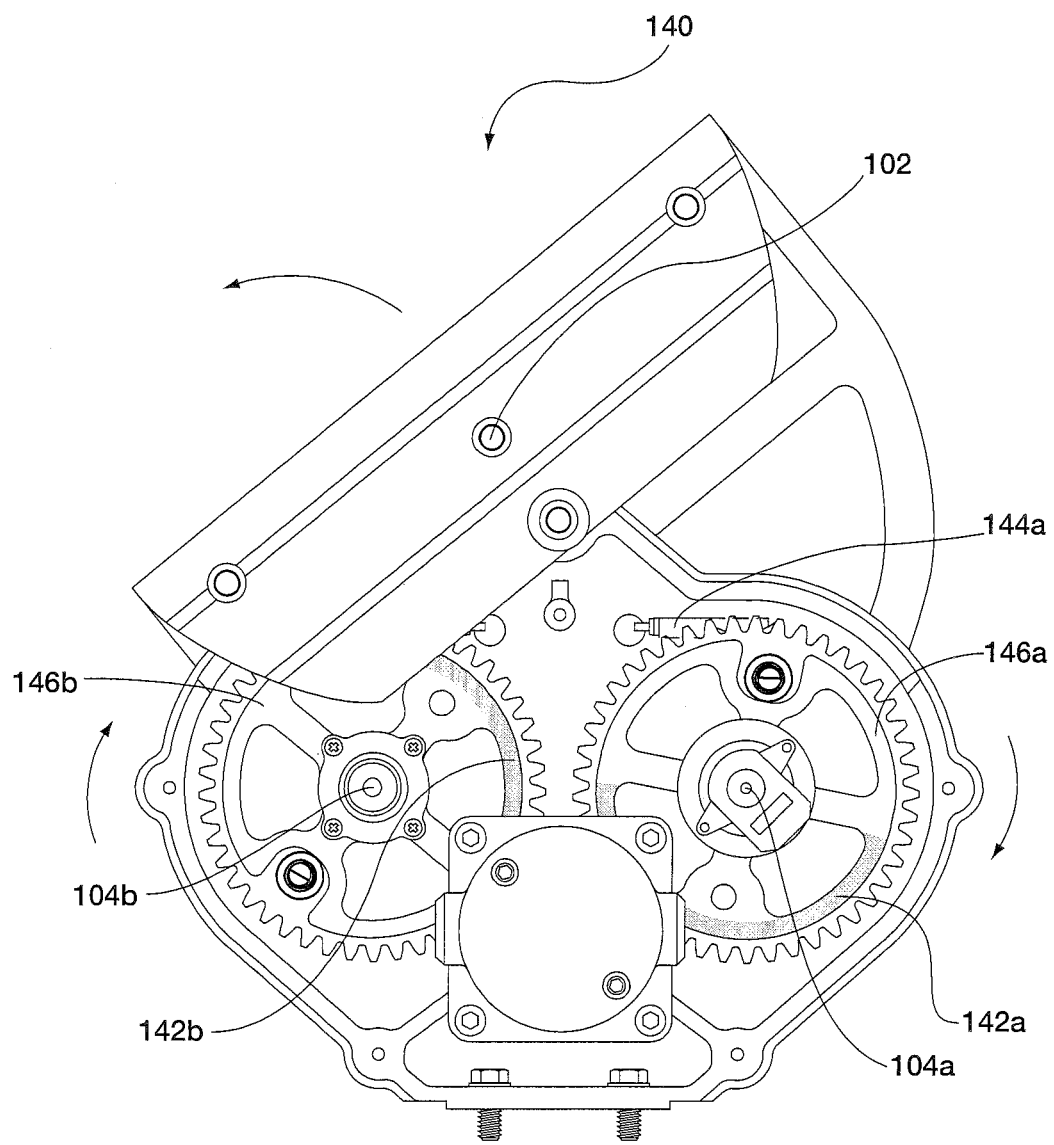
FIG. 6C shows one embodiment of a tilt sensor when the tray is in a tilted position opposite that seen in FIG. 6B.

Turning to FIGS. 6A-6C, the rotation of the gears may be monitored by the tilt sensor 140 and the information gathered by the tilt sensor and stored or processed by a controller (not shown), the controller, for example being a microprocessor, which is conventional in the art. The controller may also be used to track all packages 11 moving on the conveyor 10 and to automatically signal at the appropriate time when a particular package 11 reaches its destination unloading station or outfeed chute 18. The controller may further be connected, remotely or directly, to other features in the disclosure, such as, the tilting mechanism 50, the tilt sensor 140 and/or the opposed roller motor assembly 210.

The information gathered by the tilt sensor 140 may be used to determine a positioning of the tray 40 and also to direct the rotation of the gears 106a and 106b. Such information is important so that a faulty tilt tray may be quickly detected, errors minimized and the cart fixed.

Typically, in the field of tilt trays, a "home" sensor is used. The home sensor monitors when a tray is in its neutral position and then employs an encoder to track the distance away from home (neutral) that a tray has moved. In the case of a problem, the tray is programmed to return to the home signal and into a neutral position. However, in this scenario, if the "home" sensor is faulty or there is a power outage, then the tray loses its homing beacon and it is unable to determine the positioning of the tray. This is because the home sensor usually does not provide information about which direction the tray is tilted and without a home signal it is unable to right itself because the tray cannot recognize which direction is home.

In operation, applicant's inventions, in contrast, provides a "not home" signal to the tilt sensor 140. A reference area 142a and 142b is provided that is recognized by the switch 144a and 144b as a "home" reading. Other areas are provided 146a and 146b that do not produce a "home" signal to the switches 144a and 144b. By way of example, a metal ledge may be added to portions of the gears 106a and 106b that is detected by non-contact sensors serving as the switches 144a and 144b. The non-contact sensors may be programmed to recognize the metal reference area as a "home" signal so that when the switches are not in contact with the ledge, a "not home" signal is recognized by the switches. As may be recognized by one of skill in the art, other types of switches may recognize differing types of reference areas, and the switches may be programmed alternatively so that the "home" or "not home" signal is associated with the reference area, of which is also considered within the scope of this invention.

In FIG. 6A, the tray is shown in a neutral position. By way of example, the area 142a and 142b may produce a "home" signal as readable by the switches 144a and 144b. The area 146a and 146b of the gears 106a and 106b may produce a "not home" signal as readable by the switches 144a and 144b. In the neutral position as shown in FIG. 6A, the switches 144a and 144b would sense a "home" signal as the distal area of the switches sense reference areas 142a and 142b. As seen in FIG. 6B, when the tray 40 is tilted to the right and the gears 106a and 106b are rotated, the reference area 142a remains detectable by the switch 144a and a "home" signal is produced by switch 144a. The reference area 142b is not detectable on gear 106b and the switch 144b produces a "not home" signal.

As in FIG. 6C, when the tray 40 is tilted to the left and the gears 106a and 106b are rotated accordingly, the reference area 142a is not detected by switch 144a and a "not home" signal is generated. The reference area is detectable on gear 106b and the switch 144b produces a "home" signal.

In the dual switch configuration, the tilt sensor detects, operates and directs the rotation of the gears typically as seen in the table below:

TABLE II

| Switch 144b | Switch 144a | Reaction |
|---|---|---|
| Reference area sensed Home Reading | Reference area sensed Home Reading | Tray recognized in neutral position |
| Reference area sensed Home Reading | Reference area not sensed Not Home Reading | Tray recognized as tilted left. Gear 146a rotates to re-attain "home" reading, so gears 146a and 146b directed to rotate counterclockwise to attain tray neutral position. |
| Reference area not sensed Not Home Reading | Reference area sensed Home Reading | Tray recognized as tilted right. Gear 146b rotates to re-attain "home" reading, so gears 146a and 146b directed to rotate clockwise to reach tray neutral position. |
| Reference area not sensed Not Home Reading | Reference area not sensed Not Home Reading | Produces error notification and tray shuts down until fixed. |

The "home"/"not home" detection by the tilt sensor 140 therefore, provides information as to the positioning and direction of tilt, left or right, of the tray, as well as which way the tray needs to be moved to attain a neutral position. It is to be understood that the "home" and "not home" readings may be reversed to accomplish the same outcome. If, by way of example, a tray was tilted to the right and a faulty switch 144a resulted in an errant "not home" signal even though the reference area 142a would normally be sensed by the switch, then two "not home" signals would be produced since sensor 144b would correctly have a "not home signal." Rotating the gear 106a clockwise to try and attain two "home" signals would not correct the problem. Two "not home" signals indicates a problem and could immediately be programmed to shut down the cart and signal for maintenance.

It is to be understood therefore that in one embodiment, cam movement is toward 0 degrees in response to the tilt sensor 140. In configurations further including a second gear having a second cam, each cam movement may respond to the tilt sensor 140 when the tilt sensor monitors a reference area on the gears. The tilt sensor 140 may determine a position of the cams and a direction of tilt of the tray by reading a reference area. At least one cam may actuate the tray toward a neutral position when the sensor determines a not home signal on at least one gear.

The inventions may further include a second gear having at least a second cam and a tiltable support 58a having an incremental titling response to rotation of a first cam 110a and second cam 110b about an axis of rotation 104a and 104b.

The support 58a may attach to or include at least one camway for housing a first cam 110a and a second cam 110b. One of the cams may be housed within a camway within the support 58a and the other cam may be outside of the camway with the support when the cams are rotated substantially between about 25 degrees and about 135 degrees about an axis of rotation of each gear respectively. The support 58a may be tiltable about between 40 degrees and about 50 degrees around an axis of tilt 102 when a first cam and a second cam 110a and 110b are rotated between about 120 degrees and about 140 degrees around the axis of rotation of each gear respectively 104a and 104b.

It is also to be understood from the disclosure that rotation of the first cam 110a in a first direction around an axis or rotation 104a may tilt the tray in a direction toward one side of the conveyor. Rotation of a second cam 110b in a second direction around an axis of rotation 104b may tilt the tray 40 toward an opposite side of the conveyor than the one side. The first cam and the second cam may each rotate about an independent axis of rotation.

Each tray and tilting mechanism may be adapted so that each tray is independently dischargeable from the other trays in the conveyor train.

Additionally, the invention may further include a drive motor for moving the conveyor carts around the track.

Figure 10:
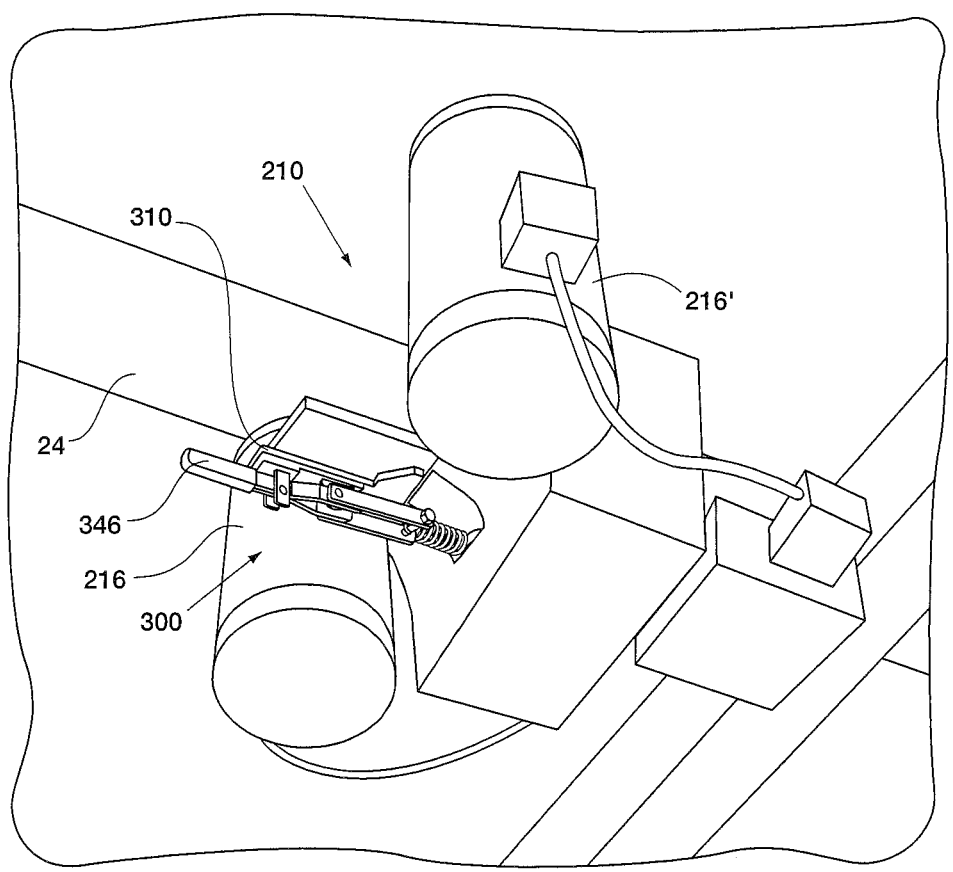
FIG. 10 is a bottom perspective view of the opposed motor roller assembly, with the track elements omitted for clarity.

The drive motors may include an opposed roller motor assembly 210, which move the conveyor carts along the conveyor track 12 by the opposed roller motor assembly. The opposed roller motor assembly 210 of the sorter conveyor 10, which is shown in FIG. 10, may be a pair of opposed drive roller assemblies 214, 214', which is discussed in more detail in FIGS. 11 and 12. A driven fin 36, which is attached to the bottom of each conveyor cart 20, hangs between the two drive roller assemblies 214, 214'.

Composed of semi-rigid, high coefficient aluminum or other conductive metal, the vertical fin 36 preferably has swept-back front 36a and rear 36b edges, as shown in FIG. 4, giving the fin 36 a generally parallelogram shape to reduce damage in the event the fin would contact a structure and to distribute the air gap over the length of the drive rollers to reduce noise and maintain more constant thrust. Specifically, because the gap is angled with respect to the roller, the roller does not hit the gap like a pot hole that is large enough for both wheels to hit at the same time.

Vertically orienting the fin 36 and the opposed roller assembly 210 also reduces problems with maintaining proper spacing between the fin 36 and the drive rollers, because gravity ceases to be a factor as the weight of the live load varies. This results in the fin 36 being easily maintained equidistant between the two drive rollers.

The opposed roller motor assembly 210 ordinarily moves the train of conveyor carts 20 in one direction of travel; however, it can also be reversed if necessary to slow or stop the conveyor.

In one exemplary embodiment, the opposed motor roller assembly 210 of the present inventions is comprised of a pair of support frames 212, 212', a pair of opposed drive roller assemblies 214, 214', and a pair of motor assemblies 216, 216'. The second drive roller assembly 214' provides the opposing surface that exerts pressure in conjunction with the first drive roller 214 on the driven fin 36 of the cart 20.

Figure 11:
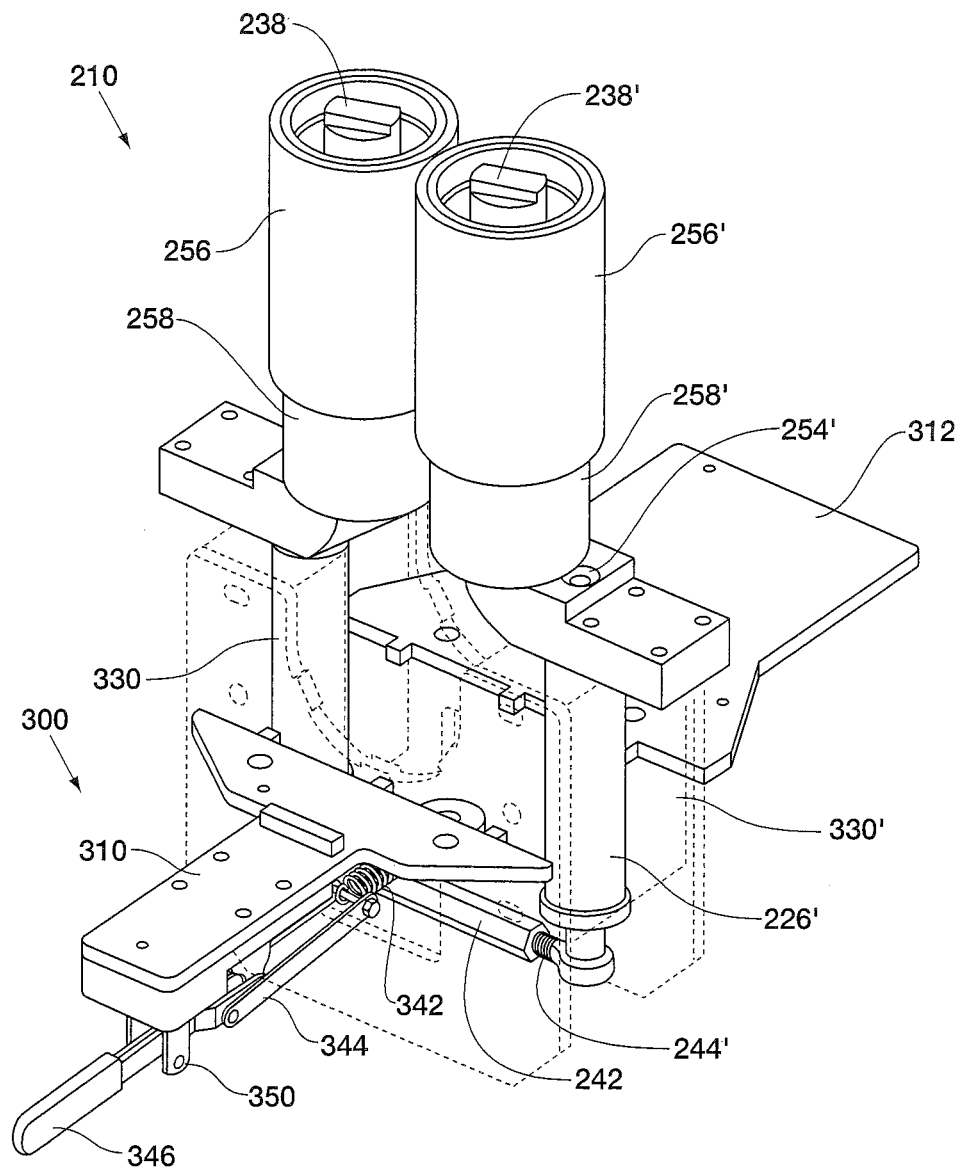
FIG. 11 is a perspective view of an isolated opposed motor roller assembly, with the elements shown in phantom and omitted for clarity.

As shown in FIGS. 10 and 11, opposed motor roller assembly 210 and self-tensioning adjustment assembly 300 generally tie movement of the rollers together. For instance, as one roller moves closer, or away, from the driven fin, the opposing roller mirrors the first rollers movement. Thereby, the drive rollers contact the driven fin simultaneously from each side to be self-centering.

Typically, the opposed roller motor assembly 210 may include a cantilevered, drive roller 214 that is connected to first pivot block assembly 330 and second pivot block assembly 330' to position drive roller 214. The pair of motor assemblies 216, 216' may be mounted on respective pivot block assemblies 330, 330' and are connected to the shafts of motor assemblies 216, 216', for instance with drive belts 262, 262'. Further, self-tensioning adjustment assembly 300 is generally affixed to base 222 and includes self-tension clamp plate weldment 310 to position the pivot block assemblies about a centered position relative to self-tensioning adjustment assembly 300.

Self-tensioning adjustment assembly 300 generally maintains opposed motor assembly 210 in perpendicular contact with the driven fin. For instance, self-tensioning adjustment assembly 300 minimizes, or prevents, twisting as the driven fin moves from one drive roller 214 to another. Additionally, self-tensioning adjustment assembly 300 maintains drive roller 214 in a neutral position with respect to driven fin 36 and guide wheels 30. In this manner, the guide wheels will not comprise the reactive pressure of drive roller 214.

As shown in FIG. 10, lever arm 346 is connected to self-tension clamp plate weldment 310 which allow adjustment of the two pivot block assemblies. As illustrated, lever arm 346 may adjust both first pivot block assembly 330 and second pivot block assembly 330'. In other examples, the first pivot block assembly 330 and second pivot block assembly 330' may be coupled together with the self-tensioning adjustment assembly 300, for instance so that movement of each pivot block assembly mirrors movement of the opposing pivot block assembly about a centered position.

FIG. 11 shows one embodiment of an isolated opposed motor roller assembly 210 that is connected to first pivot block assembly 330 and second pivot block assembly 330'. First pivot block assembly 330 and second pivot block assembly 330' position drive roller 210 adjacent to one surface of the extended driven fin. A pair of support frames 212 and base 222 are attached to the conveyor track 12 (see e.g. FIG. 1 or FIG. 3 for track 12) and self-tensioning assembly 300. Self-tensioning assembly 300 may be connected to base 222 through a weldment, for instance drive clamp plate 310. Similarly, a second weldment, for instance a drive clamp plate 312 as introduced in FIG. 13, may secure the first pivot block assembly 330 and/or second pivot block assembly 330'.

Pivot block assemblies 330, 330' may be further connected forward of the first shafts 226, 226' with a compression linkage 242. In this particular embodiment, the first end 244 of compression linkage 242 is connected to pivot block assembly 330, while the second end 244' of compression linkage 242 is connected to pivot block assembly 330'.

Figure 12:
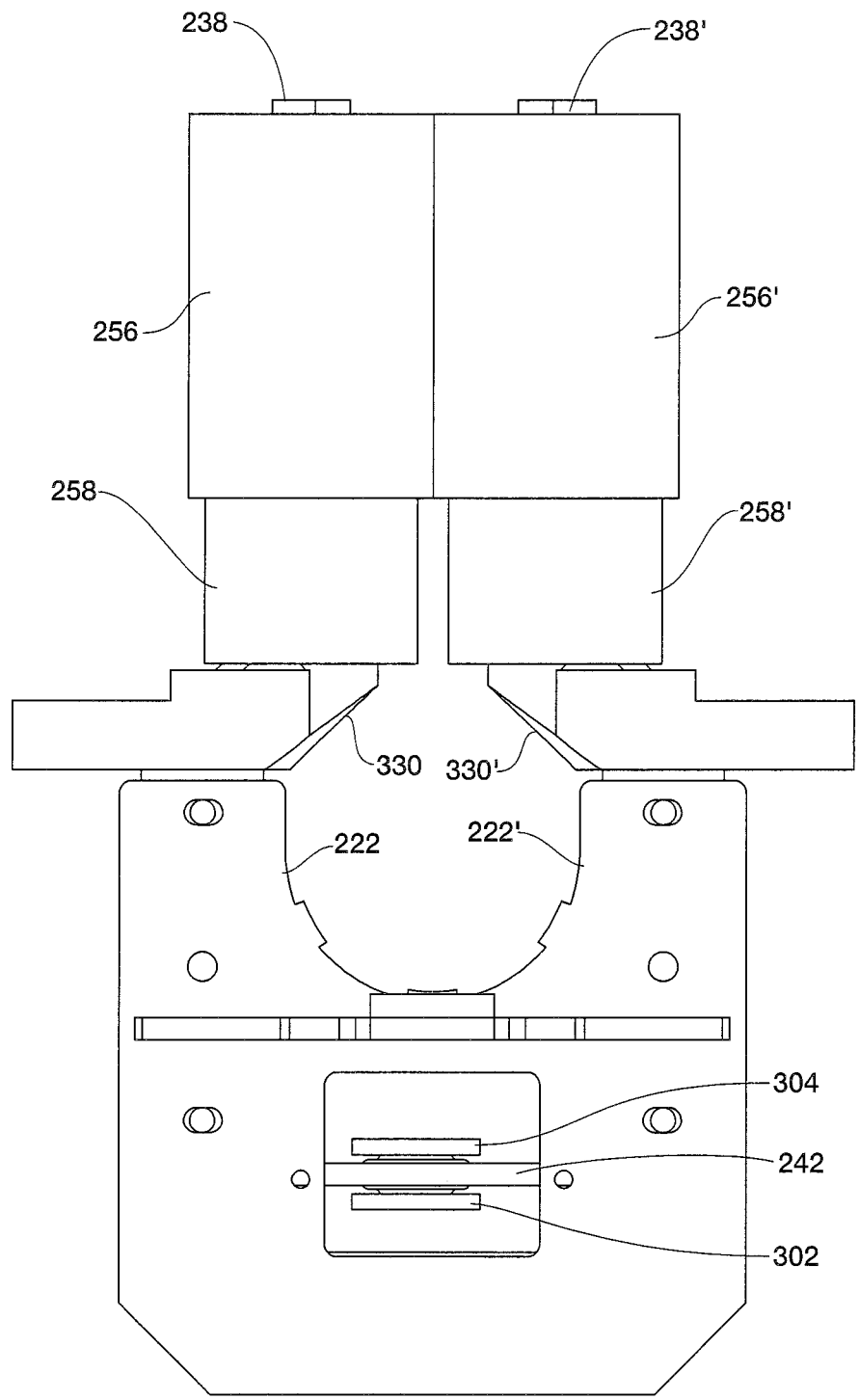
FIG. 12 is an enlarged side perspective view of an isolated opposed motor roller assembly, with elements omitted for clarity.

FIG. 12 illustrates an isolated opposed motor roller assembly embodiment having second shafts 238, 238' which pass through the pivot block assemblies 330,330'. Each pivot block assembly 330,330' includes frictional surfaces 258, 258' at the end nearest the pivot block assemblies 330,330' thereby engaging drive belts 262, 262' and outer elastomeric surfaces 256, 256'. Further, at least one link may be affixed to one of the pivot block assemblies 330,330'. Similarly, a second link may be affixed to the other pivot block assembly 330,330'. For instance, as seen in FIG. 12, a first link 302 and a second link 304 may be positioned on the corresponding pivot block assemblies 330,330'. In some examples, first link 302 and/or a second link 304 may be motor adjustment links. Other examples include a variety of additional intermittent linkage.

Figure 13A:
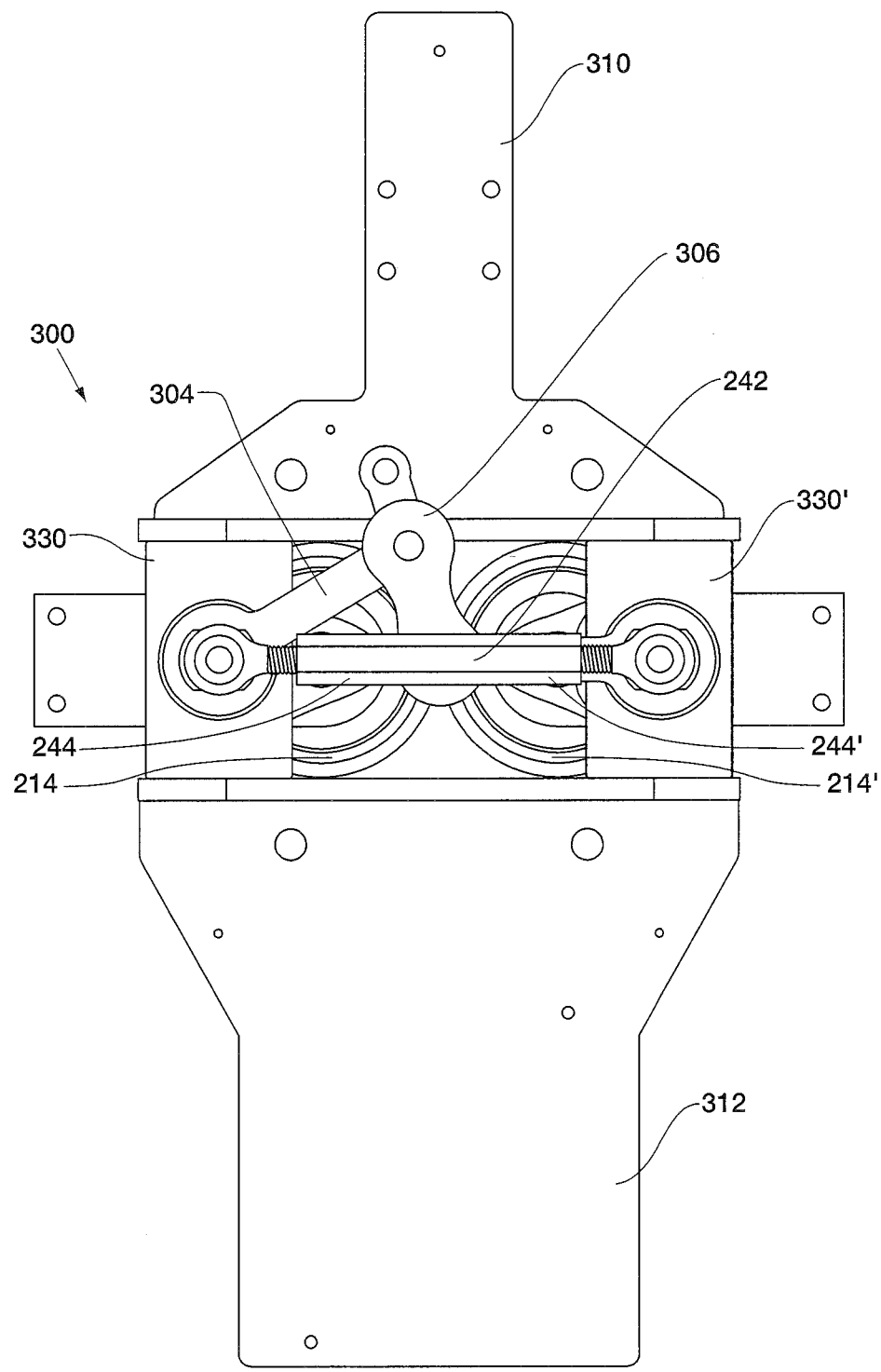
FIG. 13a is an enlarged bottom view of a self-tensioning adjustment assembly and opposed motor roller assembly, with elements omitted for clarity.

FIG. 13a shows one embodiment of self-tensioning adjustment assembly 300 and opposed motor roller assembly 210 in an operating position. Self-tensioning adjustment assembly 300 includes first link 302 (see FIG. 13B), second link 304 and connecting linkage to generally position the pair of pivot block assemblies, i.e. first pivot block assembly 330 and second pivot block assembly 300', in alignment with one-another. In yet some other examples, the connecting linkage is a connecting roller link 306, thereby coupling at least one motor adjustment link to a second link as shown in FIG. 13A.

Figure 13B:
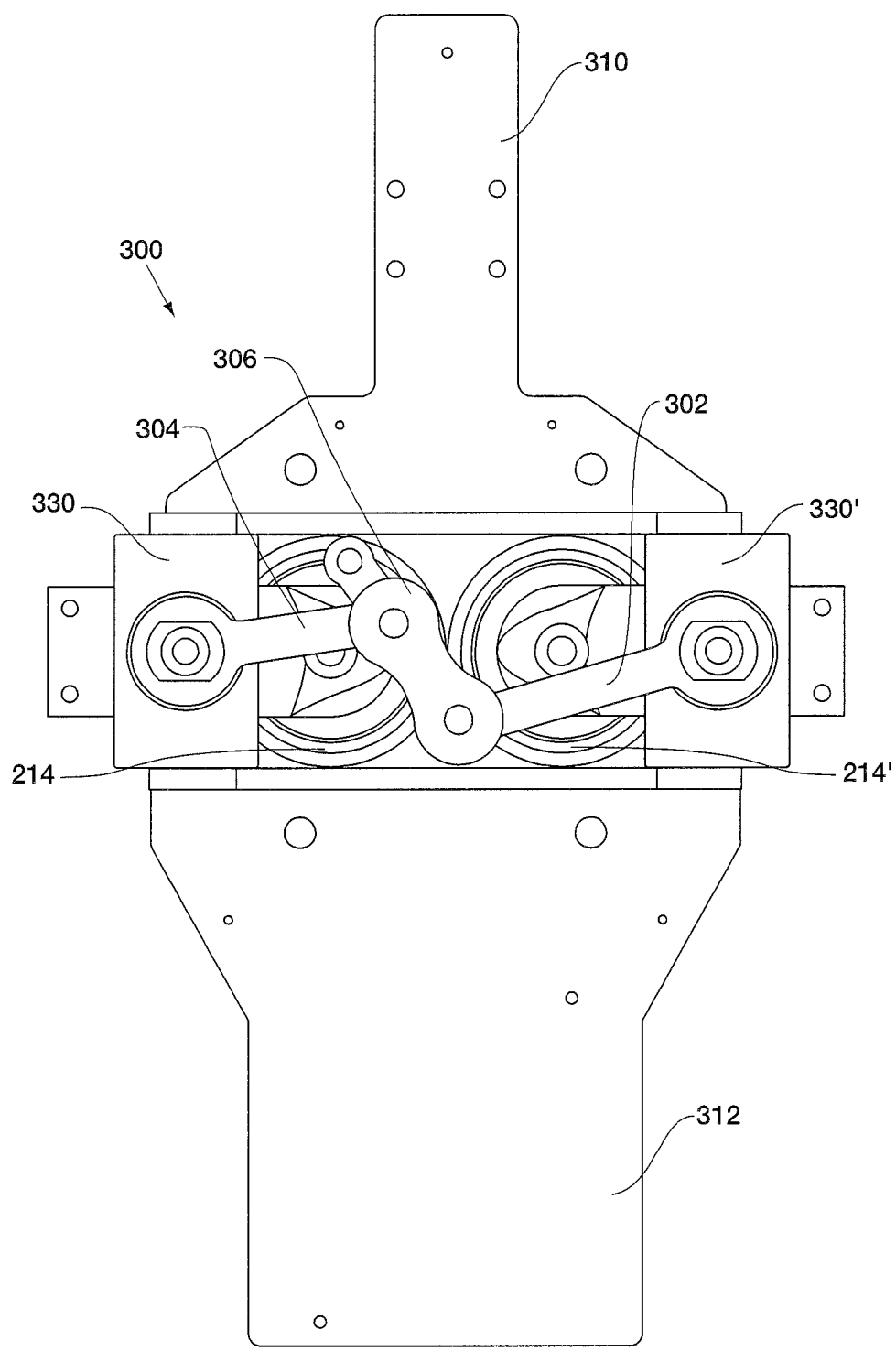
FIG. 13b is an enlarged bottom view of a self-tensioning adjustment assembly and opposed motor roller assembly, with elements omitted for clarity, in a second maintenance position.

FIG. 13b shows self-tensioning adjustment assembly 300 and opposed motor roller assembly 210 in one embodiment of a second, maintenance position. Here, first link 302, second link 304 and connecting roller link 306 tie movement of the pivot block assemblies, and associated rollers, together. As shown in this second, maintenance position, each pivot block assembly is positioned adjacent from a centerline and one-anther simultaneously in a mirroring fashion, for instance in the direction of the directional arrows indicated in FIG. 13B. This second position may be beneficial for maintenance, assembly, reassembly or the like.

Figure 14:
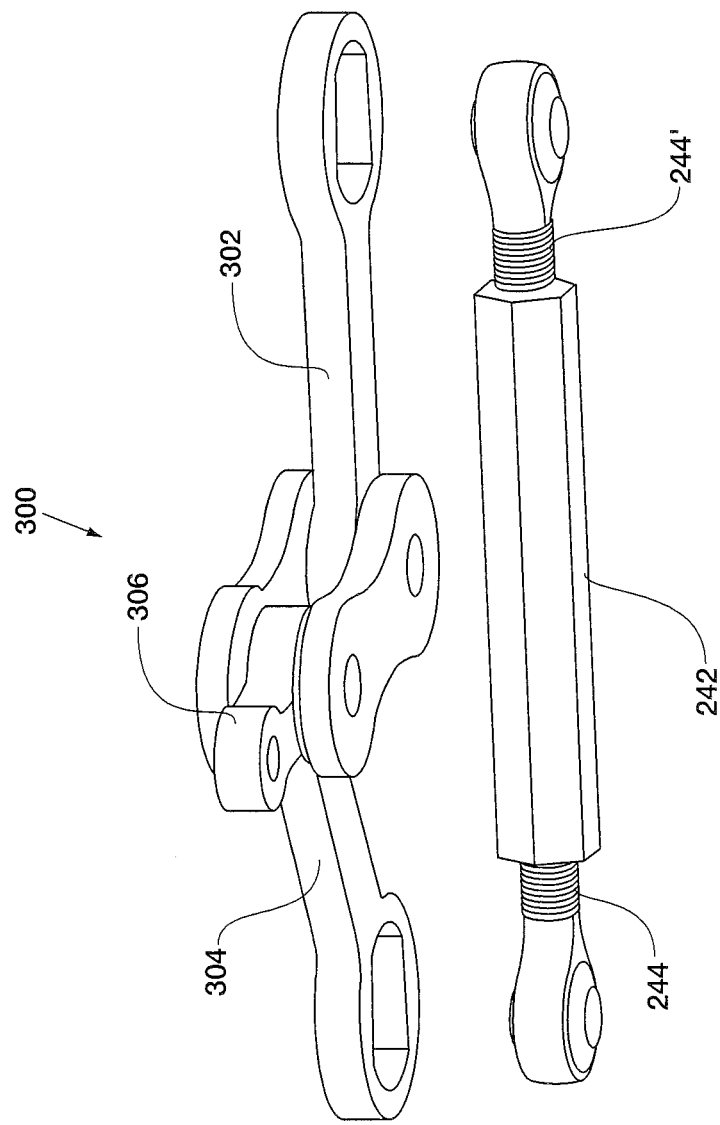
FIG. 14 is an enlarged side perspective view of isolated elements in the self-tensioning adjustment assembly, with elements omitted for clarity.

FIG. 14 illustrates certain isolated elements in self-tensioning adjustment assembly 300. For instance, self-tensioning adjustment assembly 300 may include first link 302, second link 304 and connecting roller link 306 to couple the first link 302 second link 304 in a self-centering movement so that movement of each pivot block assembly mirrors movement of the other pivot block assembly.

Figure 15:
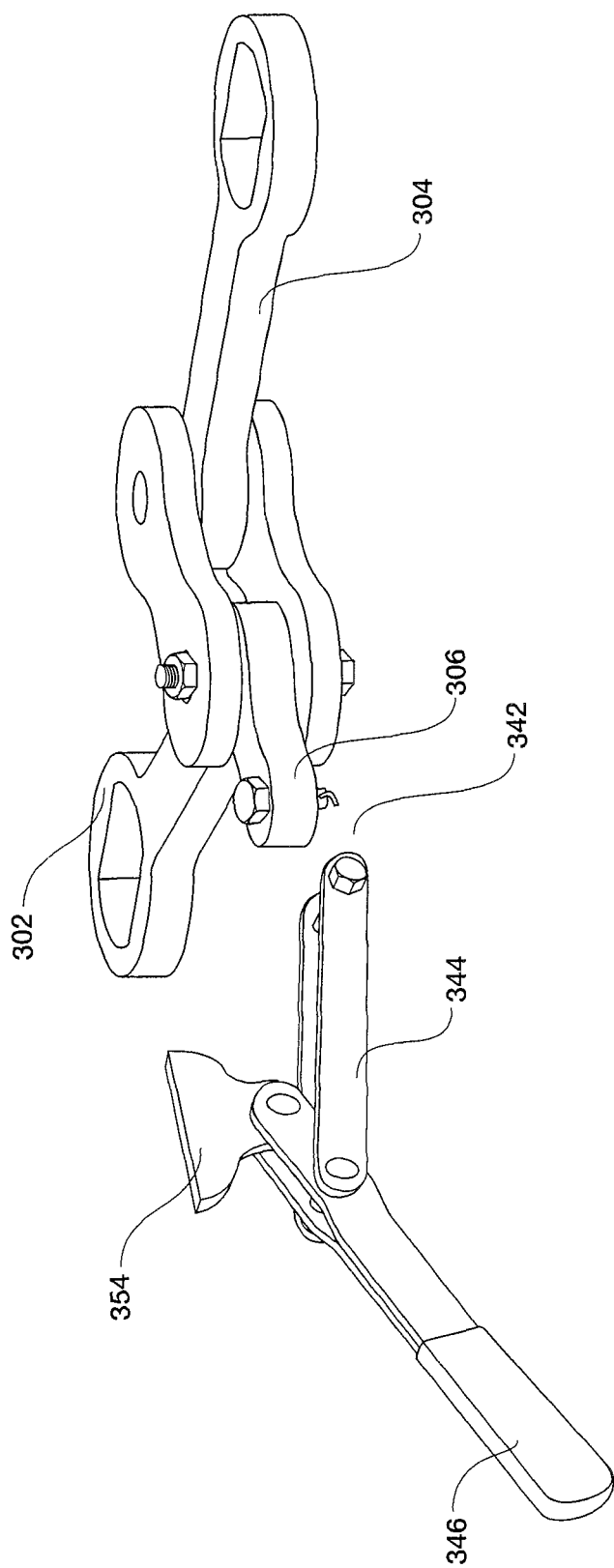
FIG. 15 is another enlarged side perspective view of isolated elements in the self-tensioning adjustment assembly, with elements omitted for clarity.
Figure 16:
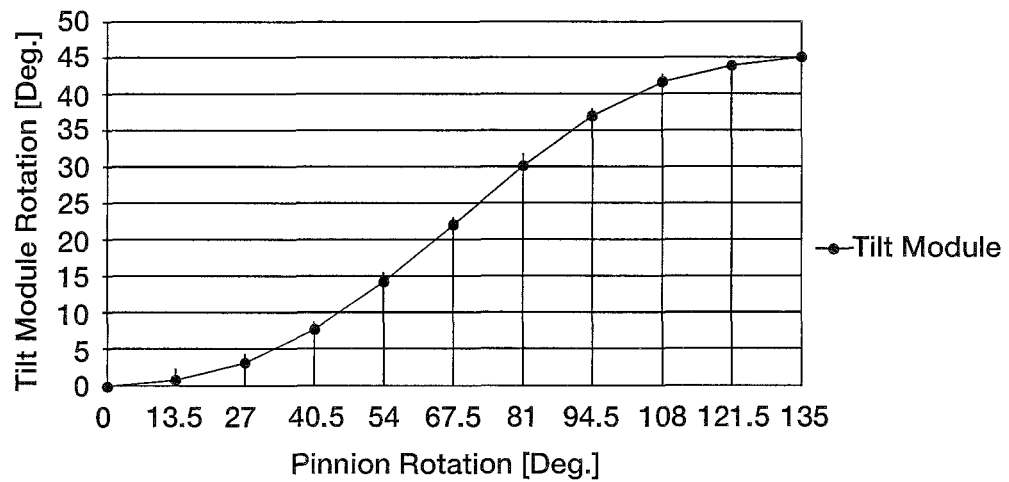
FIG. 16 is a graph illustrating gear rotation as compared to tray tilt rotation in degrees.
Figure 17:
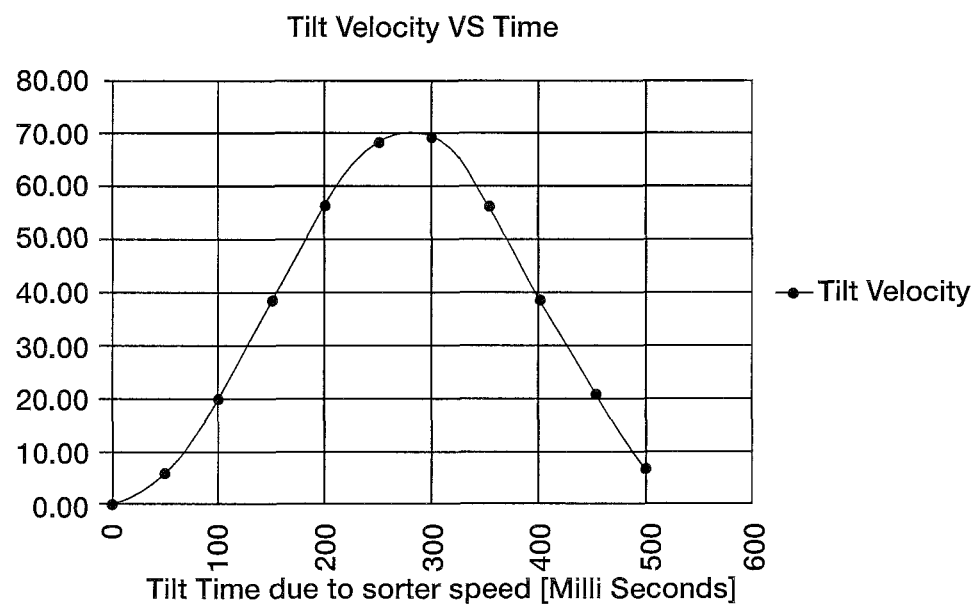
FIG. 17 is a graph illustrating tray tilt time versus tilt velocity.

FIG. 15 further shows isolated elements in self-tensioning adjustment assembly 300. Here, lever 346 is connected to self-tensioning adjustment assembly 300 and is adapted to adjust pivot block assemblies 330,330'. For instance, lever 346 mirrors each pivot block assembly about the other pivot block assembly. Self-tensioning clamp plate 310 may support lever 346. In some examples, self-tensioning clamp plate 310 includes mounting bracket 354 connecting a proximate end of lever 346 to self-tensioning clamp plate 310. A lever retainer may affix lever 346 to self-tensioning clamp plate 310 to retain a distal handling end of lever 346 in an operating position. As shown in FIG. 15, coupling arm 344 may connect lever 346 and the connecting roller link 306. Further, a spring assembly 342 may be positioned and connect coupling arm 344 and connecting roller link 306. As also shown in FIG. 11, spring assembly 342 may include spring 350 connected to self-tensioning clamp plate 310 by a spring linkage.

The drive roller assemblies 214, 214' are generally cylindrical and are made of aluminum or other light-weight alloy. They each have frictional surfaces 258, 258' at the end nearest the pivot block assemblies 330,330' for engaging drive belts 262, 262' and outer elastomeric surfaces 256, 256' of about ¼" thickness on most of the remainder of the surface. The frictional surface 258 is preferably a series of circumferential grooves that mate with the drive belt 262. The drive belt may be a poly v-belt. The outer elastomeric surface is preferably polyurethane with a durometer value (Shore Type A) between about 60 and about 90.

In addition, as discussed above, pairs of LIMB, spaced at 80 feet intervals and operated at 480 volts, draws about 15 amps. This is about 90 watts per foot of sorter for about 70 pounds of thrust. Also, a prior art chain drive would draw about 15 watts per foot of sorter for about 1500 pounds of thrust. To the contrary, the present inventions drive rollers are spaced at 160 feet intervals, operate at 480 volts and draw only about 4 amps. This is only about 12 watts per foot of sorter for about 100 pounds of thrust.

Additionally, it is contemplated that the tilt mechanism 50 and the tilt sensor 140 could be adapted for use in conjunction with a dual axis tipping cart as seen in FIGS. 8, 8a, 9 and 9a. Mounting a tilt mechanism 50 to a dual axis tipping cart may include mounting the tilt mechanism to accommodate for the angled pivot structure 58. For dual axis tipping, the pivot axis 62 lies in a vertical plane parallel to the conveyor line of travel, which is shown in the drawings as horizontal line 64. However, unlike other sorter conveyor tilting carts, the pivot axis 62 of the conveyor cart 20 of the invention is disposed at an angle θ to the conveyor line of travel 64 so as to impart two axial components to the tilting of the carrying tray 40. In this embodiment, the pivot axis 62 is angled downwardly at an angle of approximately 20 to 45 degrees below horizontal in a forward direction. The pivot axis 62 as shown is angled downwardly 30 degrees and the pivot axis 62 intersects a plane occupied by the carrying tray 40 rearward of the center of the tray 40.

By disposing the pivot axis 62 at a downwardly directed angle θ instead of parallel to the conveyor line of travel 64, two axial components are imparted to the tilting motion of the carrying tray 40. The first axial component of the tray's tilting motion is lateral tipping on a horizontal axis parallel to the conveyor line of travel 64. The second axial component of the tray's tilting motion is rotating around a vertical axis 66 perpendicular to the conveyor line of travel. Thus, while the tray only tilts along a single, angled pivot axis 62, the overall motion of the tray 40 as it tilts includes two axial components.

The tilting motion of the tray may also be described using three-dimensional X, Y, and Z-axis spatial coordinates, as shown in FIG. 9A, wherein the Y-axis is parallel to the conveyor line of travel 64, the X-axis extends horizontally perpendicular to the line of travel 64, and the Z-axis extends vertically perpendicular to the line of travel 64. In one embodiment, tilting of the tray 40 includes a Y-axis and a Z-axis component, for as shown in FIG. 9A the pivot axis 62 intersects the Y and Z axes. Specifically and for illustrative purposes only, using the preferred 37.5 degree downward angle θ of the pivot axis 62, it can be appreciated that the ratio of Y-axis motion to Z-axis motion is 60:30. In other words, with a 30 degree angle θ, the tray 40 laterally tips somewhat farther than it rotates. If the angle θ of the pivot axis 62 is increased to 45 degrees below horizontal, then the tray will tilt and rotate equally.

Figure 8:
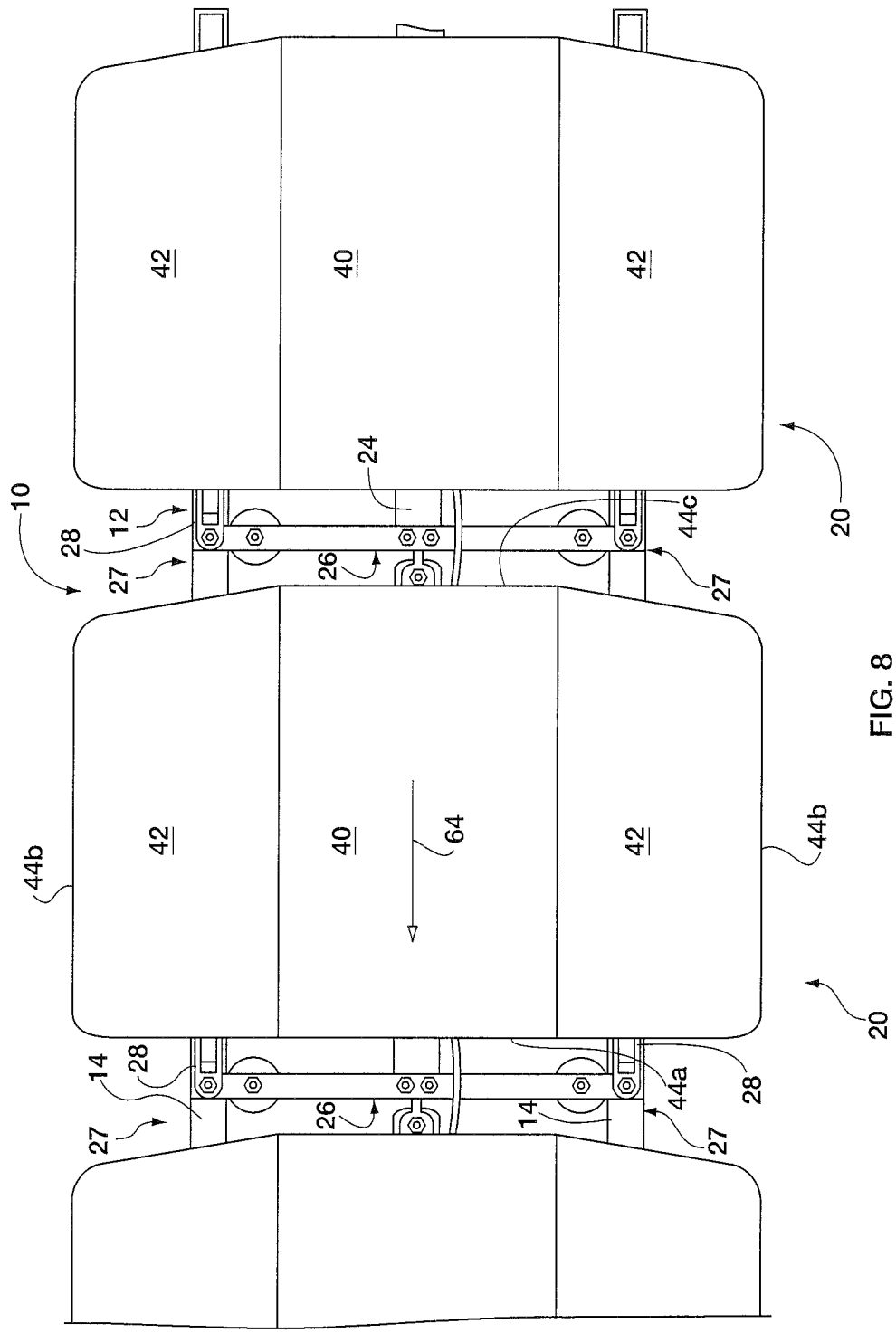
FIG. 8 is a top view of the train of carts of one embodiment of the sorting conveyor of the present inventions.
Figure 8A:
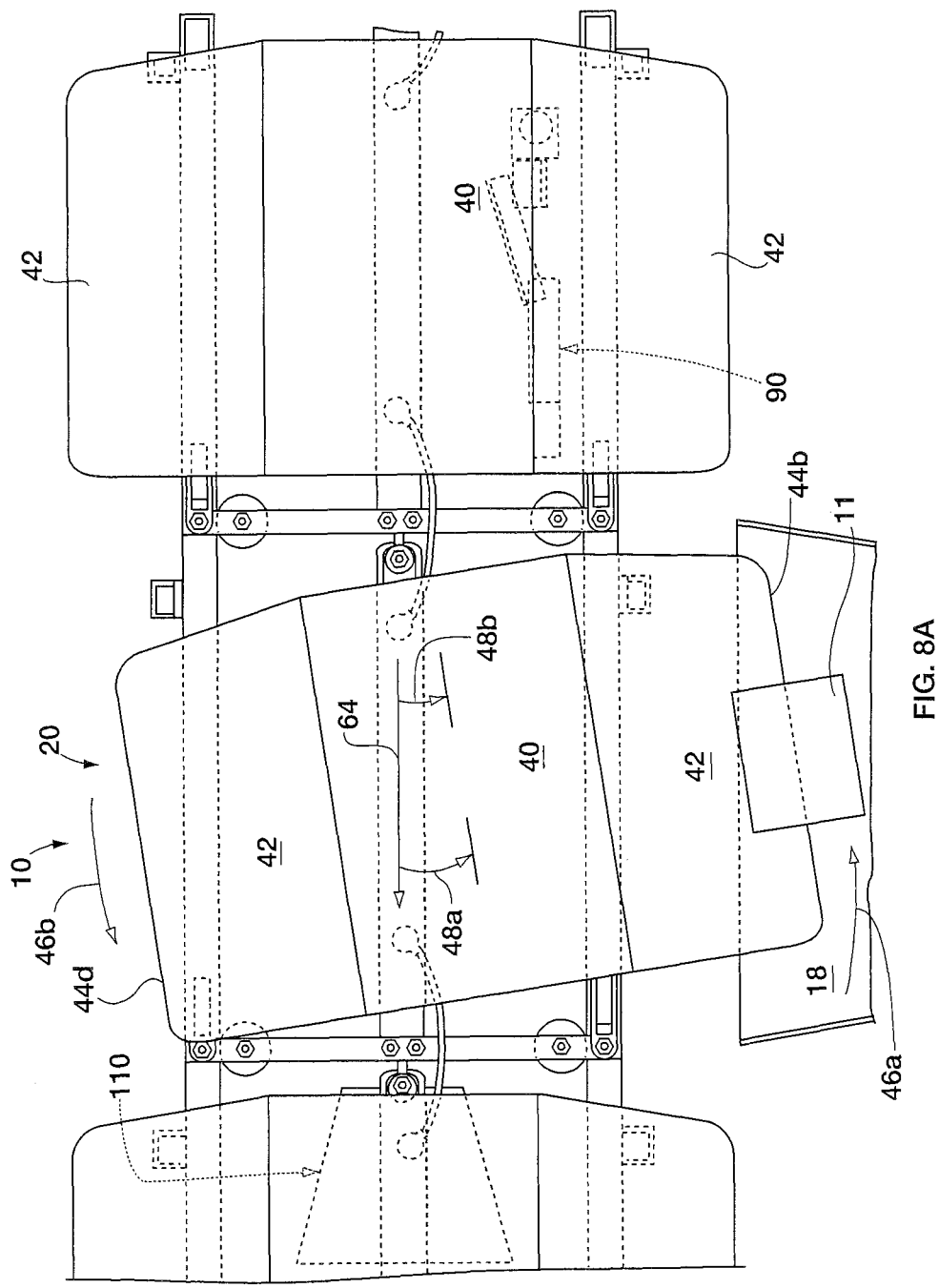
FIG. 8A shows the train of carts of FIG. 8, but with one of the carts in its tilted position and unloading a package onto an unloading station beside the sorting conveyor track.

As shown in FIGS. 8 and 8A, one effect of this two-axis tilting of the carrying tray 40 is that a side 44b of the tray that is tilted downwardly also rotates rearwardly relative to the cart 20. Side 44d of the tray, which is tilted upwardly, rotates forwardly relative to the cart 20. The pivot axis 62 may intersect the plane occupied by the tray 40 rear-of-center, the front side 44a of the tray 40 rotates a greater distance around the vertical axis 66 than the back side 44c of the tray 40, upon tilting of the tray 40. The bisecting center line of the tray 40 rotates farther at its forward end from the horizontal line of travel 64 than at its rearward end. Thus, front side rotation line 48a follows a longer arc than back side rotation line 48b. By rearwardly rotating whichever side of the tray 40 is being tilted downwardly, some rearward velocity is imparted to packages 11 as they are being discharged from the cart 20 of the invention into an unloading station 18. Thus, packages are discharged at a lower velocity relative to the unloading station than the velocity of the train of conveyor carts as a whole. This enables the packages to be discharged into a narrower chute than could be accomplished using a conventional conveyor cart. Additionally, because the packages are slowed down somewhat as they are discharged, there is less potential for damage to occur.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed:

1. A sorting conveyor for transporting objects and unloading objects at one or more unloading stations adjacent the conveyor, said sorting conveyor comprising:
   (a) a conveyor track;
   (b) a train of conveyor carts connected end-to-end; and
   (c) at least one of said conveyor carts including
      (i) a frame base for engaging said conveyer track,
      (ii) a carrying tray for holding the objects,
      (iii) a support for supporting said carrying tray above said frame base,
      (iv) a tilting mechanism including at least one gear having at least one cam for tilting said carrying tray toward at least one side of the conveyor, wherein said tilting mechanism includes a second gear wheel having a second cam, said first cam rotating about a first axis of rotation and said second cam rotating about a second axis of rotation, wherein the first axis of rotation and the second axis of rotation are independent and set apart from each other, and
      (v) a drive motor and a driven member attached to said frame base for moving said conveyor carts around said track, and having an opposed roller motor assembly for moving said conveyor carts on said conveyor track.

2. The apparatus according to claim 1, including a self-tensioning adjustment assembly including (i) at least one motor adjustment link affixed to one of said pivot block assemblies, (ii) a second link affixed to said other pivot block assembly, and (iii) a connecting roller link coupling said at least one motor adjustment link and said second link.

3. The apparatus according to claim 2, wherein said second link is a motor adjustment link.

4. The apparatus according to claim 2, wherein said frame base includes a lower base portion attached to said conveyor track and said self-tensioning adjustment assembly.

5. The apparatus according to claim 4, wherein said self-tensioning adjustment assembly includes a drive clamp plate connected to said lower base portion.

6. The apparatus according to claim 2, including a lever connected to said self-tensioning adjustment assembly and adapted to adjust said pivot block assemblies.

7. The apparatus according to claim 6, wherein said lever is adapted so that movement of each pivot block assembly mirrors movement of the other pivot block assembly.

8. The apparatus according to claim 1, wherein said pivot block assemblies are coupled together and adapted so that movement of each pivot block assembly mirrors movement of the other pivot block assembly.

9. The apparatus according to claim 8, wherein said driven member of said frame base comprises a fin moved in the conveyor line of travel by said opposed roller motor assembly.

10. The apparatus according to claim 9, wherein said opposed roller motor assembly and said fin are both vertically oriented beneath said trailer frame base.

11. The apparatus according to claim 9, wherein said fin is generally parallelogram-shaped with rearwardly angled front and rear edges.

12. The apparatus according to claim 8, wherein said drive roller assembly includes a generally cylindrical roller having an outer elastomeric surface for frictionally engaging said driven member.

13. The apparatus according to claim 12, wherein said elastomeric surface is a polyurethane.

14. The apparatus according to claim 13, wherein said polyurethane has a Shore A hardness between about 70 and about 80.

15. In a sorting conveyor for transporting objects and unloading objects at one or more unloading stations adjacent the conveyor, said sorting conveyor having a conveyor track and a train of conveyor carts connected end-to-end, at least one of said conveyor carts comprising:
   (a) a frame base for engaging said conveyer track;
   (b) a carrying tray for holding the objects;
   (c) a support for supporting said carrying tray above said frame base;
   (d) a tilting mechanism including at least one gear wheel having at least one cam for tilting said carrying tray toward at least one side of the conveyor, wherein said tilting mechanism includes a second gear wheel having a second cam, said first cam rotating about a first axis of rotation and said second cam rotating about a second axis of rotation, wherein the first axis of rotation and the second axis of rotation are independent and set apart from each other; and
   (e) a tilt sensor for determining the direction of tilt of said tray.

16. The apparatus according to claim 15, wherein said tilting mechanism is adapted so that each tray is independently dischargeable from said other trays in said conveyor train.

17. The apparatus according to claim 15, wherein said tilt sensor includes a direction indicator.

18. The apparatus according to claim 17, wherein said direction indicator is configured to sense a reference area on said at least one gear.

19. The apparatus according to claim 18, wherein said tilt sensor is a dual sensor.

20. The apparatus according to claim 15, wherein said tilt sensor includes a positioning indicator.

21. The apparatus according to claim 20, wherein said positioning indicator is configured to sense a reference area on said at least one gear.

22. The apparatus according to claim 21, wherein said positioning indicator includes a dual sensor.

23. The apparatus according to claim 15, wherein said at least one cam is rotatable around an axis of rotation of said at least one gear between about 0 degrees and about 360 degrees.

24. The apparatus according to claim 23, wherein said at least one cam travels between about 0 degrees and about 140 degrees around said axis of rotation.

25. The apparatus according to claim 23, wherein said cam moves toward about 0 degrees in response to said tilt sensor.

26. The apparatus according to claim 23, wherein rotation of said at least one cam in a first direction around an axis of rotation of said at least one gear tilts said tray in a direction toward one side of said conveyer.

27. The apparatus according to claim 26, wherein rotation of said first cam in a first direction around the first axis of rotation tilts said tray in a direction toward one side of said conveyer and wherein rotation of said second cam in a second direction around the second axis of rotation tilts said tray toward an opposite side of said conveyer than said one side.

28. The apparatus according to claim 26, wherein rotation of said cams in a clockwise or counterclockwise direction is opposite the tilt of said tilt tray in a clockwise or counterclockwise direction.

29. The apparatus according to claim 15, wherein each cam movement responds to said tilt sensor and whereby said tilt sensor monitors a reference area on said gears.

30. The apparatus according to claim 29, wherein at least one cam actuates said tray toward a neutral position when said tilt sensor determines a not home signal on at least one said gear.

31. The apparatus according to claim 15, wherein said support is a tiltable support having an incremental tilting response to rotation of said first and second cams about an axis of rotation.

32. The apparatus according to claim 31, wherein said tiltable support includes at least one camway for housing said first cam and said second cam.

33. The apparatus according to claim 32, wherein one of said cams is housed within a camway within said tiltable support and the other cam is outside of said camway within said tiltable support when said cams are rotated substantially between about 25 degrees and about 135 degrees about an axis of rotation of each gear respectively.

34. The apparatus according to claim 32, wherein said tiltable support tilts about between about 40 degrees and about 50 degrees around the axis of tilt when said first cam and said second cam are rotated between about 120 degrees and about 140 degrees around said axis of rotation of each gear respectively.

35. The apparatus according to claim 32, wherein said cams are rotatable substantially between about 0 degrees and about 25 degrees about an axis of rotation of each gear respectively.

36. The apparatus according to claim 15, wherein said axis of rotation of said first gear and said second gear is between about 0 degrees and about 360 degrees.

37. The apparatus according to claim 36, wherein said first cam and said second cam travel between about 0 degrees and 140 degrees around said respective axis of rotation.

38. The apparatus according to claim 37, wherein said first cam rotates about between 0 and 140 degrees around said axis of rotation of said first gear and said second cam rotates about between 0 and 140 degrees around said axis of rotation of said second gear.

39. The apparatus according to claim 15, further including at least one drive for actuating said tilting mechanism.

40. The apparatus according to claim 39, wherein said drive is a gear drive for interacting with at least said first gear.

41. A sorting conveyor for transporting objects and unloading objects at one or more unloading stations adjacent the conveyor, said sorting conveyor comprising:
    (a) a conveyor track;
    (b) a train of conveyor carts connected end-to-end;
    (c) at least one of said conveyor carts including
        (i) a frame base for engaging said conveyer track,
        (ii) a carrying tray for holding the objects,
        (iii) a support for supporting said carrying tray above said frame base,
        (iv) a tilting mechanism including at least one gear having at least one cam for tilting said carrying tray toward at least one side of the conveyer, wherein said tilting mechanism includes a second gear wheel having a second cam, said first cam rotating about a first axis of rotation and said second cam rotating about a second axis of rotation, wherein the first axis of rotation and the second axis of rotation are independent and set apart from each other, and
        (v) a tilt sensor for determining the direction of tilt of said tray; and
    (d) a drive motor and a driven member attached to said frame base for moving said conveyor carts around said track, and wherein said drive motor further includes an opposed roller motor assembly for moving said conveyor carts on said conveyor track, said opposed roller motor assembly including a cantilevered, drive roller connected to one pivot block assembly and another pivot block assembly adapted for positioning said drive roller, wherein said pivot block assemblies are coupled together and adapted so that movement of each pivot block assembly mirrors movement of the other pivot block assembly, and wherein said pivot block assemblies are coupled together.

* * * * *